United States Patent
Higashimoto

(10) Patent No.: US 9,325,904 B2
(45) Date of Patent: *Apr. 26, 2016

(54) IMAGE PROCESSING DEVICE, IMAGE PROCESSING METHOD AND PROGRAM

(71) Applicant: Sony Corporation, Tokyo (JP)

(72) Inventor: Kimu Higashimoto, Tokyo (JP)

(73) Assignee: Sony Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/589,083

(22) Filed: Jan. 5, 2015

(65) Prior Publication Data

US 2015/0156420 A1 Jun. 4, 2015

Related U.S. Application Data

(63) Continuation of application No. 13/581,693, filed as application No. PCT/JP2011/000616 on Feb. 3, 2011, now Pat. No. 8,970,765.

(30) Foreign Application Priority Data

Mar. 5, 2010 (JP) .................................. 2010-048751

(51) Int. Cl.
*H04N 5/232* (2006.01)
*G06F 3/0481* (2013.01)
(Continued)

(52) U.S. Cl.
CPC .......... *H04N 5/23293* (2013.01); *G06F 3/0488* (2013.01); *G06F 3/04815* (2013.01); *H04N 1/00352* (2013.01); *H04N 1/00392* (2013.01); *H04N 1/00458* (2013.01);
(Continued)

(58) Field of Classification Search
CPC .......... H04N 5/23293; H04N 1/00392; H04N 5/2316; H04N 1/2112; H04N 1/00458; G06F 3/0488; G06F 3/00352; G06F 17/30274
USPC ........................... 348/333.05, E5.024, 333.06
See application file for complete search history.

(56) References Cited

U.S. PATENT DOCUMENTS 6,314,426 B1  11/2001 Martin et al.
8,970,765 B2 *  3/2015 Higashimoto ........... 348/333.06
(Continued)

FOREIGN PATENT DOCUMENTS

CN  101320385 A  12/2008
JP  06-004208 A  1/1994
(Continued)

OTHER PUBLICATIONS

Supplementary European Search Report from EP Application No. 11750304, dated Oct. 28, 2013.
(Continued)

*Primary Examiner* — Tuan Ho
*Assistant Examiner* — Marly Camargo
(74) *Attorney, Agent, or Firm* — Lerner, David, Littenberg, Krumholz & Mentlik, LLP

(57) ABSTRACT

An image processing device may include a control unit. The control unit may be operable, in a first mode, to control display on a display screen of a representative image of a group of images and, in a second mode, to control display on the display screen of an image of the group of images corresponding to a posture of the device. In addition, the control unit may be operable to switch between operation in the first mode and the second mode.

42 Claims, 22 Drawing Sheets

(51) Int. Cl.
*G06F 3/0488* (2013.01)
*H04N 1/00* (2006.01)
*H04N 1/21* (2006.01)
*H04N 101/00* (2006.01)

(52) U.S. Cl.
CPC ........ *H04N 1/2112* (2013.01); *H04N 5/23216* (2013.01); *G06F 2200/1637* (2013.01); *H04N 2101/00* (2013.01); *H04N 2201/0084* (2013.01)

(56) References Cited

U.S. PATENT DOCUMENTS

| | | | |
|---|---|---|---|
| 2002/0109782 A1 | 8/2002 | Ejima et al. | |
| 2007/0165115 A1 | 7/2007 | Sugimoto | |
| 2007/0260994 A1* | 11/2007 | Sciammarella | G06F 3/0481 715/769 |
| 2007/0290999 A1* | 12/2007 | Cho | G06F 1/1626 345/158 |
| 2008/0138040 A1 | 6/2008 | Ieda | |
| 2008/0151125 A1 | 6/2008 | Bucchieri | |
| 2008/0165152 A1* | 7/2008 | Forstall | G06F 1/1626 345/173 |
| 2008/0205869 A1 | 8/2008 | Nose | |
| 2009/0153341 A1 | 6/2009 | Spalink | |
| 2009/0204920 A1* | 8/2009 | Beverley | G06T 3/4038 715/768 |
| 2010/0134656 A1* | 6/2010 | Ogawa | H04N 5/23245 348/231.2 |
| 2011/0032384 A1 | 2/2011 | Ono | |
| 2011/0074671 A1* | 3/2011 | Shimosato | H04N 5/23293 345/156 |

FOREIGN PATENT DOCUMENTS

| | | |
|---|---|---|
| JP | 2008-072515 A | 3/2008 |
| JP | 2009-027398 A | 2/2009 |
| WO | 2009145335 A1 | 12/2009 |

OTHER PUBLICATIONS

Office Action from Chinese Application No. 2011-80012510.5, dated Jun. 27, 2014.

* cited by examiner

Fig. 4

210 IMAGE MANAGEMENT INFORMATION STORAGE UNIT

| GROUP IDENTIFICATION INFORMATION 211 | IMAGE CONTENT IDENTIFICATION INFORMATION 212 | GROUP PRESENCE 213 | REPRESENTATIVE IMAGE 214 | MANIPULATION METHOD 215 |
|---|---|---|---|---|
| #101 | #1 | ABSENCE | ABSENCE | ABSENCE |
| #102 | #2 | PRESENCE | #3 | HORIZONTAL ROTATION |
|  | #3 | PRESENCE |  |  |
|  | #4 | PRESENCE |  |  |
| #103 | #5 | ABSENCE | ABSENCE | ABSENCE |
| #104 | #6 | ABSENCE | ABSENCE | ABSENCE |
| #105 | #7 | PRESENCE | #9 | VERTICAL ROTATION |
|  | #8 | PRESENCE |  |  |
|  | #9 | PRESENCE |  |  |
|  | #10 | PRESENCE |  |  |
|  | #11 | PRESENCE |  |  |
|  | #12 | PRESENCE |  |  |
| #106 | #13 | ABSENCE | ABSENCE | ABSENCE |
| #107 | #14 | PRESENCE | #15 | HORIZONTAL MOVEMENT |
|  | #15 | PRESENCE |  |  |
|  | #16 | PRESENCE |  |  |
|  | #17 | PRESENCE |  |  |
| #108 | #18 | PRESENCE | #18 | VERTICAL MOVEMENT |
|  | #19 | PRESENCE |  |  |
| ⋮ | ⋮ | ⋮ | ⋮ | ⋮ |

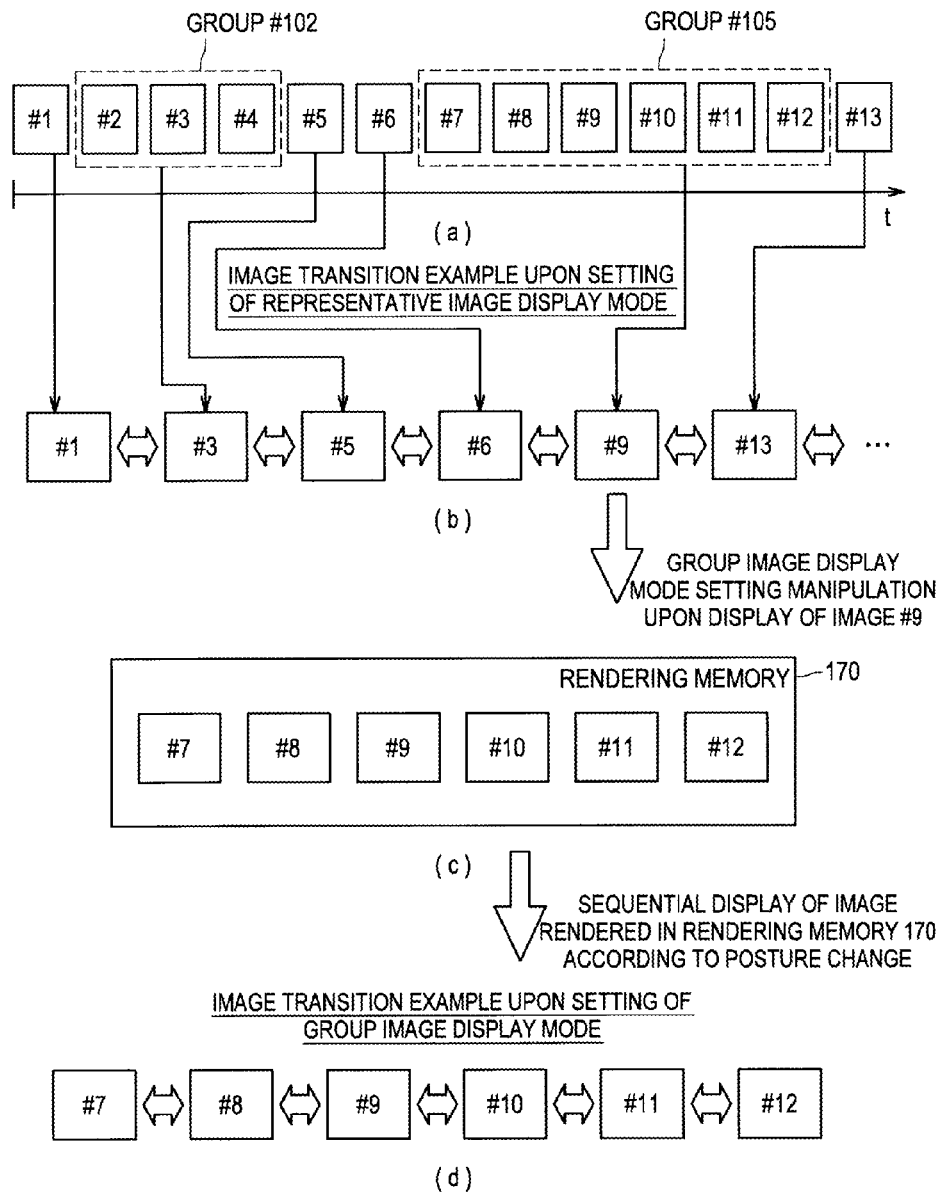

Fig. 6

DISPLAY TRANSITION EXAMPLE UPON SETTING OF REPRESENTATIVE IMAGE DISPLAY MODE

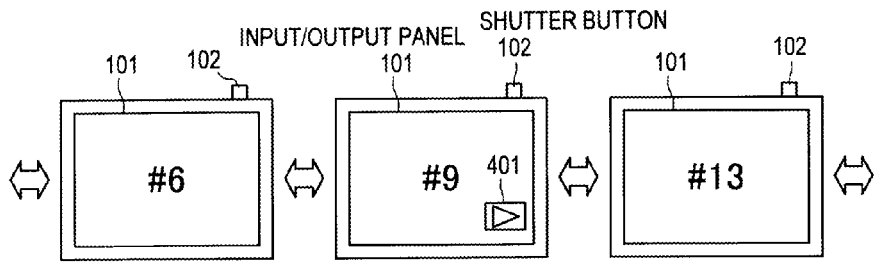

(a)

GROUP IMAGE DISPLAY MODE SETTING MANIPULATION UPON DISPLAY OF IMAGE #9

TOUCH MANIPULATION ON DISPLAY SURFACE (REPRESENTATIVE IMAGE DISPLAY MODE SETTING MANIPULATION)

DISPLAY EXAMPLE IN RENDERING PROCESS

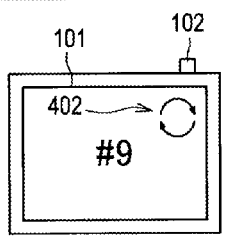

(b)

TERMINATION OF RENDERING PROCESS OF IMAGE TO BE DISPLAYED UPON SETTING OF GROUP IMAGE DISPLAY MODE

DISPLAY TRANSITION EXAMPLE UPON SETTING OF GROUP IMAGE DISPLAY MODE

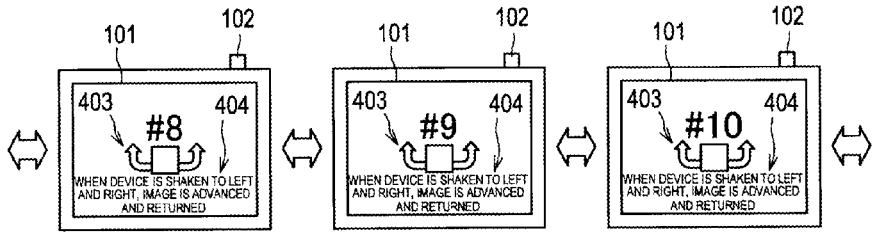

(c)

IMAGE PROCESSING DEVICE, IMAGE PROCESSING METHOD AND PROGRAM

CROSS-REFERENCE TO RELATED APPLICATION

The present application is a continuation of U.S. application Ser. No. 13/581,693, filed Aug. 29, 2012, which is a National Phase entry Under 35 U.S.C. §371 of Application No. PCT/JP2011/000616, filed Feb. 3, 2011, which claims priority to Japanese Patent Application No. 2010-048751 filed in the Japan Patent Office on Mar. 5, 2010, the entire contents of which are hereby incorporated by reference.

BACKGROUND OF THE INVENTION

The present invention relates to an image processing device, and more particularly, to an image processing device and an image processing method for displaying an image, and a program for causing a computer to execute the method.

In recent years, imaging devices such as digital still cameras or digital video cameras (e.g., camera-integrated recorders) for imaging a subject such as a person or an animal to generate image data and recording the image data as image content have been used. Also, an imaging device capable of determining a plurality of thus recorded image contents as one group according to a user's preference and performing content management (e.g., management in a photographing date unit) in the determined group unit has been proposed. For example, the content management can be performed by determining a plurality of image contents associated with one another as one group.

A number of reproduction apparatuses for displaying the thus recorded image contents have been proposed. For example, there is a reproduction apparatus for performing image advancing by user manipulation using a manipulation member and sequentially displaying a plurality of images. Also, there is a reproduction apparatus in which a user changes a posture of the reproduction apparatus to change displayed content of a display unit.

For example, an information processing device for obtaining a movement amount or a rotation amount of a body and instructing, for example, to scroll displayed content of a display unit according to the amount has been proposed (e.g., see Patent Literature 1).

According to the above-described related art, the displayed content of the display unit can be changed by changing the posture of a device, making it possible for a user to easily perform a changing manipulation in a state in which the user holds the device by hand.

Here, in the case in which desired image content is displayed when the content management is performed in the group unit, for example, selection of a group to which the desired image content belongs and sequential display of image contents belonging to the group is assumed to be performed. However, image display switching and the change of the posture of the device for performing the display switching are assumed not to correspond to each other according to the type of image content belonging to each group. In this case, when a plurality of images associated with one another belonging to the same group is displayed, each image is assumed not to be easily viewed.

In the light of the foregoing, it is desirable to display each image to be easily viewed when a plurality of images associated with one another are displayed.

SUMMARY OF THE INVENTION

In accordance with one aspect of the invention, an image processing device may include a control unit operable, in a first mode, to control display on a display screen of a representative image of a group of images and, in a second mode, to control display on the display screen of an image of the group of images corresponding to a posture of the device. In addition, the control unit may be operable to switch between operation in the first mode and the second mode.

In accordance with another aspect of the invention, a method of image processing may include, in a first mode, controlling display on a display screen of a representative image of a group of images, and, in a second mode, controlling display on the display screen of an image of the group of images corresponding to a posture of the device. The method further may include switching between the first mode and the second mode.

In accordance with another aspect of the invention, a non-transitory recording medium may be recorded with a computer-readable program executable by a computer for enabling the computer to perform image processing. The program may include the steps of, in a first mode, controlling display on a display screen of a representative image of a group of images, and, in a second mode, controlling display on the display screen of an image of the group of images corresponding to a posture of the device. The program may further include the step of switching between the first mode and the second mode.

BRIEF DESCRIPTION OF THE DRAWINGS

FIG. 4 schematically shows stored content of the image management information storage unit 210 in the first embodiment of the present invention.

FIG. 5 schematically shows an image display transition example on the input/output panel 101 in the first embodiment of the present invention.

FIG. 6 schematically shows an image display transition example on the input/output panel 101 in the first embodiment of the present invention.

DETAILED DESCRIPTION

Figure 1A:
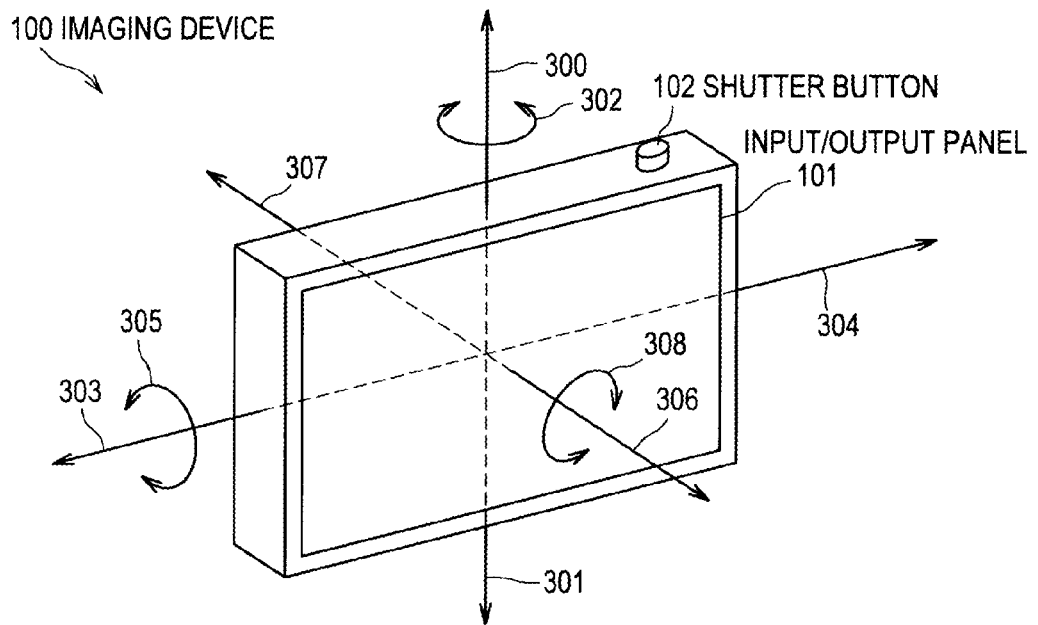
FIG. 1A shows an appearance configuration example of an imaging device 100 in a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted. The description will be predetermined in the following order.

1. First embodiment (display control: an example in which images belonging to a group corresponding to a representative image designated in a representative image display mode are displayed in a group image display mode)

2. Second embodiment (display control: an example in which images to be displayed are subjected to an interleaving process in a group image display mode)

1. First Embodiment

Appearance Configuration Example of Imaging Device

Figure 1B:
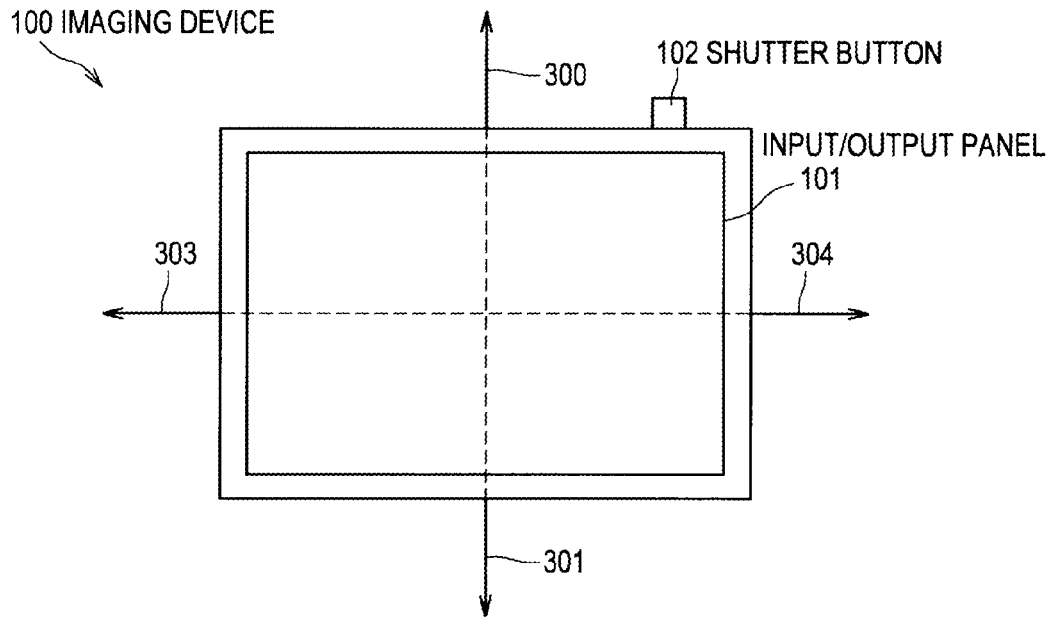
FIG. 1B shows an appearance configuration example of an imaging device 100 in a first embodiment of the present invention.

FIGS. 1A and 1B show an appearance configuration example of an imaging device 100 in a first embodiment of the present invention. FIG. 1A is a perspective view showing an appearance at a display surface side of the imaging device 100. FIG. 1B is a side view showing an appearance at the display surface side of the imaging device 100. The imaging device 100 is realized, for example, by a digital still camera or a digital video camera (e.g., camera-integrated recorder) capable of imaging a subject to generate image data, recording the image data as image content, and displaying the image content.

The imaging device 100 includes an input/output panel 101 and a shutter button 102. The imaging device 100 is an image processing device that can be carried by a user and the user can view an image displayed on the input/output panel 101. The imaging device 100 is one example of an image processing device defined in the claims.

The input/output panel 101 displays various images and receives a manipulation input from a user by detecting a contact manipulation on the input/output panel 101. The shutter button 102 is a button pressed by a photographer when image data (an imaged image) generated by imaging a subject is recorded as image content (a still image file).

The imaging device 100 includes other manipulation members such as a power switch and a mode switching switch, a lens unit, and the like, but such manipulation members will not be shown and described herein for ease of explanation. Here, the lens unit (not shown) is an optical system including a plurality of lenses for focusing light from the subject, an aperture, and the like.

Here, a change of posture of the imaging device 100 will be described. For example, the user may change rotation angles (i.e., a yaw angle, a pitch angle, and a roll angle) about three orthogonal axes in a state in which the user holds the imaging device 100 by hand. For example, the user may change the posture of the imaging device 100 in a direction indicated by the arrow 302 (the yaw angle), the axis of which is the arrow 300 (or the arrow 301). The change example is shown in FIG. 2B. For another example, the user may change the posture of the imaging device 100 in a direction indicated by the arrow 305 (the pitch angle), the axis of which is the arrow 303 (or the arrow 304). For yet another example, the user may change the posture of the imaging device 100 in a direction indicated by the arrow 308 (the roll angle), the axis of which is the arrow 306 (or the arrow 307).

Further, for example, the user may change the posture of the imaging device 100 by moving (sliding) the imaging device 100 along a straight line on a plane in a state in which the user holds the imaging device 100 by hand. For example, the user may change the posture by moving the imaging device 100 in the direction indicated by the arrow 300 or the arrow 301 (movement in a vertical direction in FIG. 1B). For another example, the user may change the posture by moving the imaging device 100 in a direction indicated by the arrow 303 or 304 (movement in a horizontal direction in FIG. 1B). This change example is shown in FIG. 2C. Further, for example, the user may change the posture by moving the imaging device 100 in a direction indicated by the arrow 306 or 307.

(Use Example of Imaging Device)

Figure 2A:
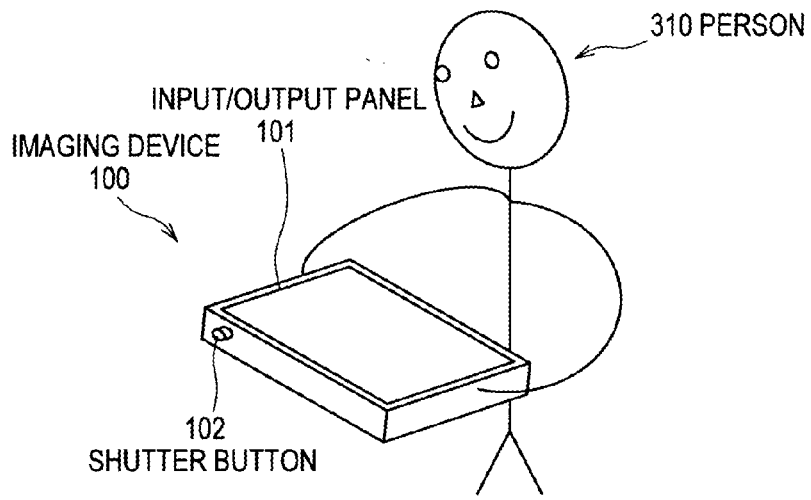
FIG. 2A shows one example of posture when the imaging device 100 is used in the first embodiment of the present invention.
Figure 2B:
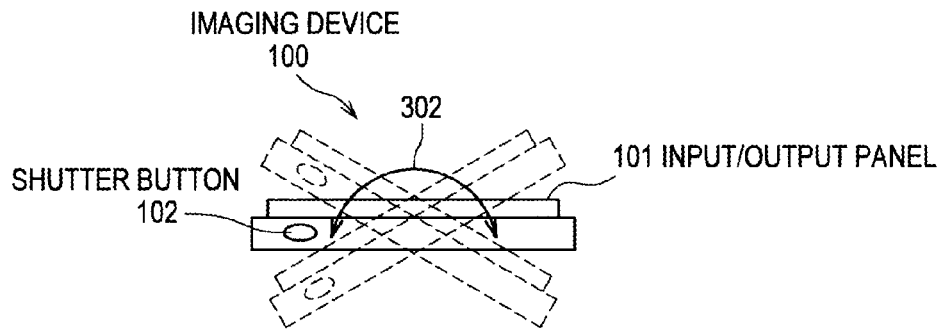
FIG. 2B shows one example of posture when the imaging device 100 is used in the first embodiment of the present invention.
Figure 2C:
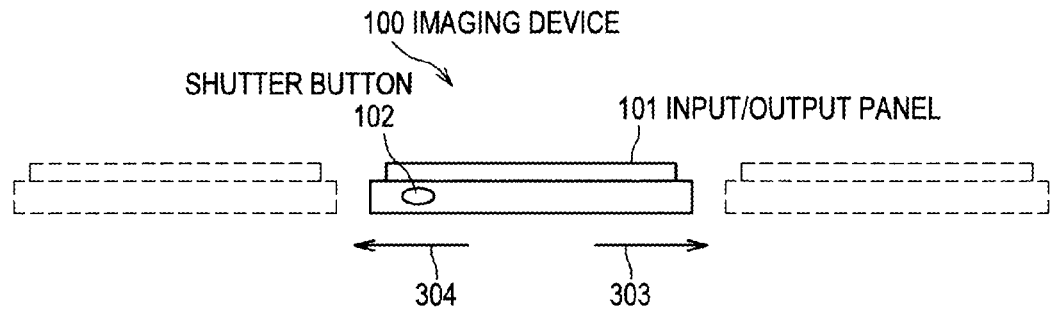
FIG. 2C shows one example of posture when the imaging device 100 is used in the first embodiment of the present invention.

FIGS. 2A to 2C show one example of the posture when the imaging device 100 is used in the first embodiment of the present invention. In FIG. 2A, one example of the posture of the imaging device 100 when image content reproduction is performed using the imaging device 100 is shown. When a person 310 performs the image content reproduction using the imaging device 100, the person 310 may view an image displayed on the input/output panel 101, for example, in a state in which the person 310 holds the imaging device 100 with both hands as shown in FIG. 2A.

In FIGS. 2B and 2C, a transition example in which the posture of the imaging device 100 is changed is shown. In FIG. 2B, a transition example when the imaging device 100 is rotated in the direction indicated by the arrow 302 about the arrow 300 (301) shown in FIG. 1A to change the posture is shown.

In FIG. 2C, a transition example in which the imaging device 100 is moved in the direction indicated by the arrows 303 and 304 shown in FIGS. 1A and 1B to change the posture is shown. In the first embodiment of the present invention, an example in which an image displayed on the input/output panel 101 is sequentially changed by changing the posture of the imaging device 100 as such is shown. That is, an example in which the image displayed on the input/output panel 101 is sequentially changed by gesture manipulation by the user is shown. Such changes of the image display status will be described in detail with reference to FIGS. 7A to 13C.

(Functional Configuration Example of Imaging Device)

Figure 3:
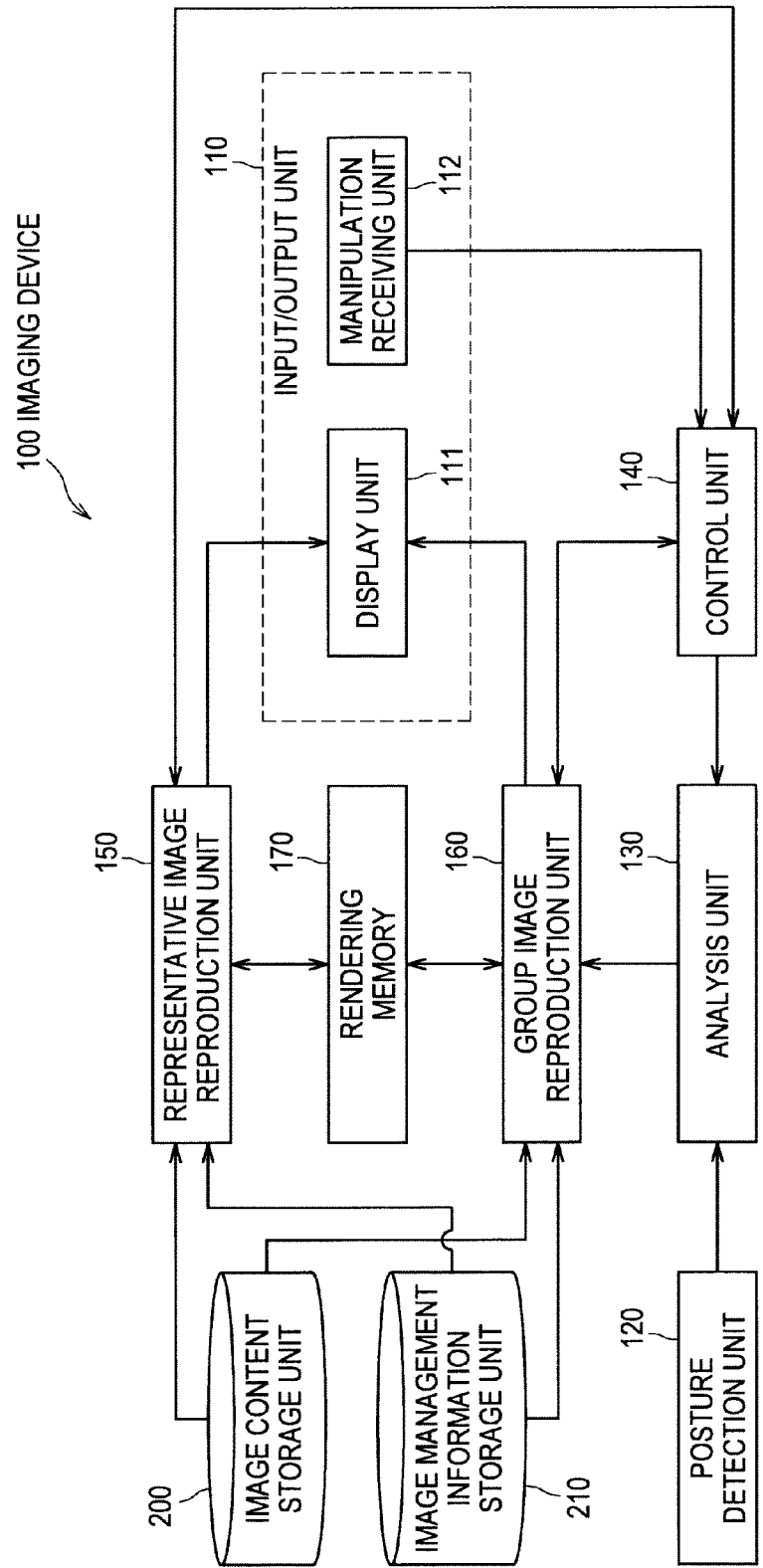
FIG. 3 is a block diagram showing a functional configuration example of the imaging device 100 in the first embodiment of the present invention.

FIG. 3 is a block diagram showing a functional configuration example of the imaging device 100 in the first embodiment of the present invention. The imaging device 100 includes an input/output unit 110, a posture detection unit 120, an analysis unit 130, a control unit 140, a representative image reproduction unit 150, a group image reproduction unit 160, a rendering memory 170, an image content storage unit 200, and an image management information storage unit 210.

The image content storage unit 200 stores image data (an imaged image) generated by the imaging unit (not shown) as an image file (image content (still image content or moving image content)). The image content storage unit 200 supplies the stored image content to the representative image reproduction unit 150 or the group image reproduction unit 160. In the first embodiment of the present invention, an example in which the still image content is used as the image content is shown.

The image management information storage unit 210 stores management information (image management information) on the image content stored in the image content storage unit 200. Using the image management information, reproduction in the representative image display mode and the group image display mode is performed. Here, the representative image display mode is a mode in which a representative image of grouped image contents and an image of non-grouped image content among the image contents stored in the image content storage unit 200 are sequentially displayed according to user manipulation. The group image display mode is a mode in which images of each grouped image content among the image contents stored in the image content storage unit 200 are sequentially displayed according to the change of the posture of the imaging device 100. The image content storage unit 200 and the image management information storage unit 210 may be, for example, one or a plurality of removable recording media, such as discs, such as digital versatile discs (DVDs) or semiconductor memories such as memory cards. The recording media may be embedded in the imaging device 100 or detachably provided in the imaging device 100.

The input/output unit 110 includes a display unit 111 and a manipulation receiving unit 112. The display unit 111 is a display unit for displaying an image supplied from the representative image reproduction unit 150 or the group image reproduction unit 160. Various menu screens or various images are displayed on the display unit 111. The display unit 111 may be, for example, a liquid crystal display (LCD) or an organic electro luminescence (EL) panel.

The manipulation receiving unit 112 is a manipulation receiving unit for receiving content of a manipulation by the user, and supplies a manipulation signal dependent on the received manipulation content to the control unit 140. The manipulation receiving unit 112 corresponds to, for example, the manipulation member such as the shutter button 102 shown in FIGS. 1A and 1B or a touch panel. For example, the touch panel is superimposed on the display unit 111 to transmit the screen of the display unit 111, and receives a manipulation input from the user by detecting an object contacting the display surface. That is, when a user presses a desired location, for example, by touching the display surface in the input/output unit 110 with his or her finger, the touch panel detects a coordinate of the pressed location and outputs a manipulation signal corresponding to the detected coordinate to the control unit 140. When the control unit 140 acquires the manipulation signal, the control unit 140 executes a predetermined process based on the acquired manipulation signal. The manipulation receiving unit 112 may be, for example, a touch panel for converting a contact on a display surface into an electrical signal using a dedicated sensing device and outputting the converted electrical signal to the control unit 140. Further, the manipulation receiving unit 112 may be, for example, a touch panel of an optical sensor type capable of detecting an object (e.g., a user's finger) approaching or contacting a display surface. The input/output unit 110 corresponds to a manipulation member such as the shutter button 102 or the input/output panel 101 shown in FIGS. 1A and 1B.

The posture detection unit 120 detects a change of the posture of the imaging device 100 by detecting acceleration, movement, tilt and the like of the imaging device 100, and outputs posture change information about the detected change of the posture to the analysis unit 130. For example, the posture detection unit 120 detects a movement direction and a movement amount in a specific direction of the imaging device 100 as the change of the posture of the imaging device 100. The posture detection unit 120 may be realized by a gyro sensor (angular velocity sensor) or an acceleration sensor. The posture detection unit 120 is an example of a detection unit defined in the claims.

The analysis unit 130 analyzes the changed amount of the posture of the imaging device 100 (e.g., the movement direction and the movement amount) based on the posture change information output from the posture detection unit 120 and determines whether the image displayed on the display unit 11 should be switched (image advancing or image returning). The analysis unit 130 outputs the determination result (an image display switching instruction) to the group image reproduction unit 160. Specifically, when the group image display mode is set, the control unit 140 outputs an analysis instruction and analysis reference information (determination reference information (e.g., a manipulation method 215 shown in FIG. 4) used for the determination as to whether the image should be switched) to the analysis unit 130. Further, a location of the posture of the imaging device 100 when the analysis instruction is output is used as a reference location, and according to the analysis reference information, the analysis unit 130 determines whether the image should be switched based on the posture change information output from the posture detection unit 120. The analysis unit 130 outputs the determination result to the group image reproduction unit 160. For example, the analysis unit 130 determines whether the posture of the imaging device 100 is changed above a certain amount based on the posture change information output from the posture detection unit 120. Subsequently, when the posture of the imaging device 100 is changed above a certain amount, the analysis unit 130 determines whether the change corresponds to a manipulation method (the manipulation method 215 shown in FIG. 4) according to the analysis reference information. Subsequently, when the change corresponds to the manipulation method, the analysis unit 130 outputs the image display switching instruction (an image advancing or image returning instruction) to the group image reproduction unit 160 based on the change amount. The determination as to whether image should be switched will be described in detail with reference to FIGS. 7A to 7C.

The control unit 140 controls each unit of the imaging device 100 based on the manipulation content from the manipulation receiving unit 112. For example, the control unit 140 sets the representative image display mode when the manipulation receiving unit 112 receives a representative image display mode setting manipulation and sets the group image display mode when the manipulation receiving unit 112 receives a group image display mode setting manipulation.

Figure 7A:
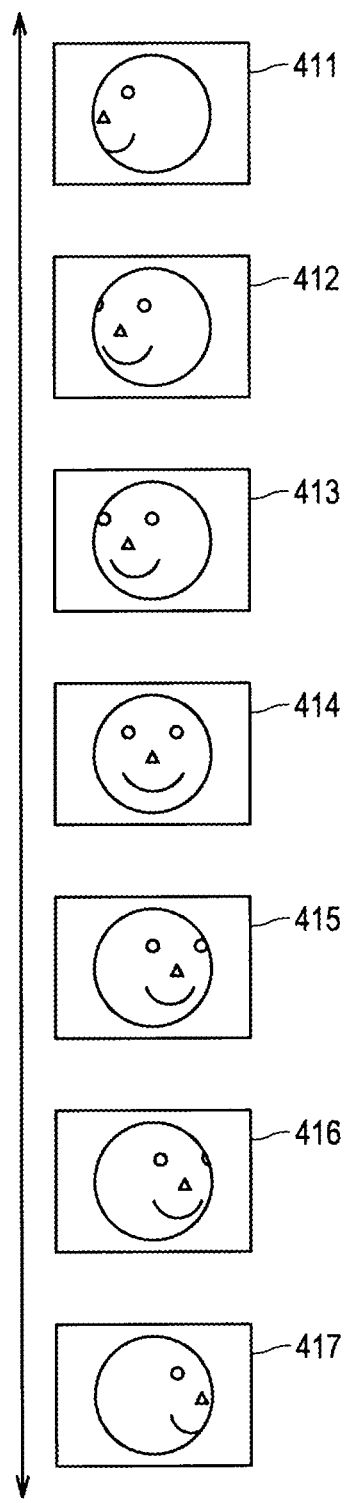
FIG. 7A shows a relationship between images displayed on the input/output panel 101 and postures of the imaging device 100 in the first embodiment of the present invention.
Figure 7B:
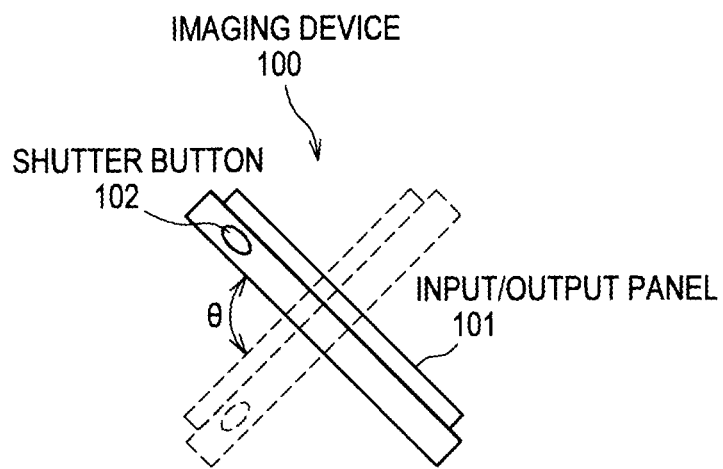
FIG. 7B shows a relationship between images displayed on the input/output panel 101 and postures of the imaging device 100 in the first embodiment of the present invention.
Figure 11C:
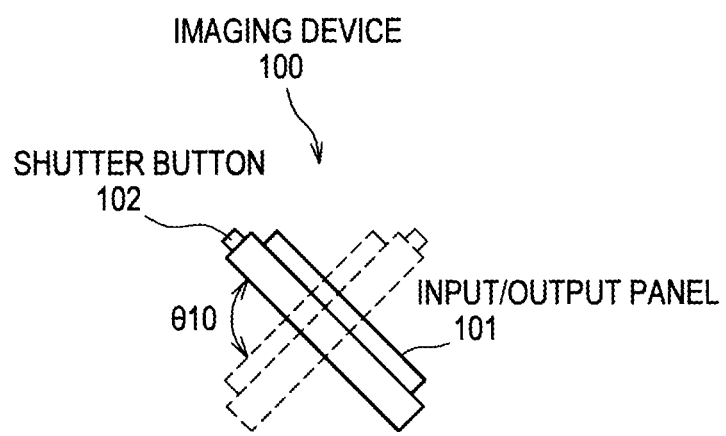
FIG. 11C schematically shows a relationship between a display transition example in the input/output panel 101 and the posture of the imaging device 100 in the first embodiment of the present invention.
Figure 11D:
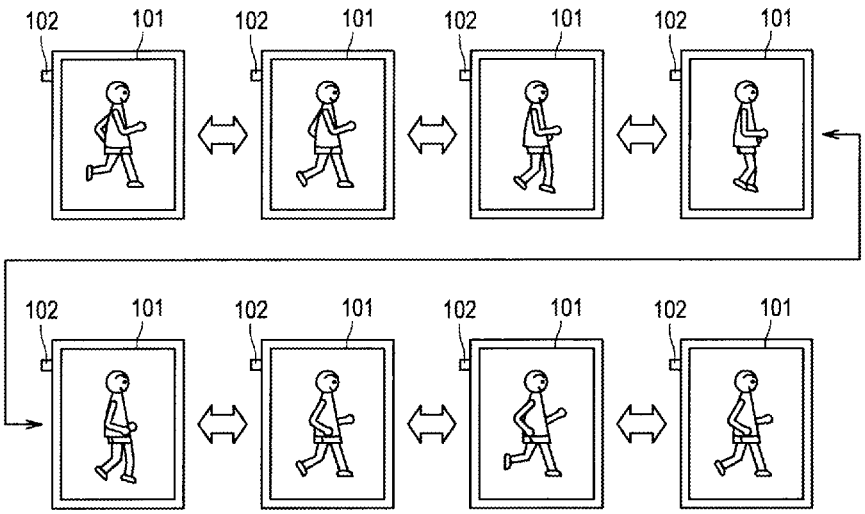
FIG. 11D schematically shows a relationship between a display transition example in the input/output panel 101 and the posture of the imaging device 100 in the first embodiment of the present invention.
Figure 12A:
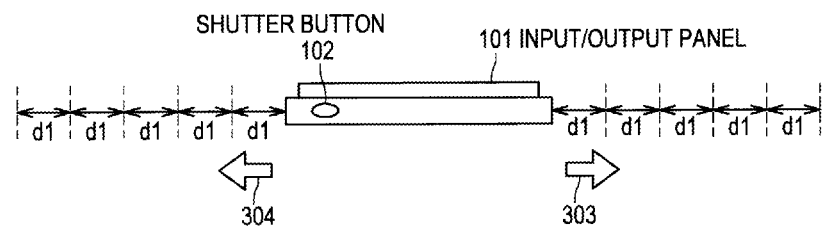
FIG. 12A schematically shows a relationship between a display transition example in the input/output panel 101 and the posture of the imaging device 100 in the first embodiment of the present invention.

Further, when the group image display mode setting manipulation is received, the control unit 140 controls to sequentially display, on the display unit 111, the images in the group corresponding to the representative image displayed on the display unit 11 upon a setting manipulation. When the group image display mode is set, the control unit 140 controls to sequentially display, on the display unit 111, the images in the group, based on the posture change detected by the posture detection unit 120 and the correlativity between the images in the group. Here, the correlativity between the images in the group refers to, for example, correlativity between the images upon imaging by the imaging device 100. For example, an indication that a plurality of images generated by changing a view for a target subject (e.g., a face of a person) as shown in FIG. 7A are multi-view images is obtained as the correlativity. In this case, as shown in FIG. 7B, the images in the group can be sequentially displayed by horizontally rotating the imaging device 100. For example, an indication that a plurality of images generated by moving the imaging device 100 according to a movement of the target subject (e.g., person) as shown in FIG. 11D are operation state images of the moving target subject is obtained as the correlativity. In this case, the images in the group can be sequentially displayed by horizontally rotating the imaging device 100 as shown in FIG. 11C. Further, for example, an indication that a plurality of images produced by imaging a moving target subject (e.g., airplane) using a fixed imaging device 100 as shown in FIG. 12C are horizontal movement images is obtained as the correlativity. In this case, the images in the group can be sequentially displayed by horizontally moving the imaging device 100, as shown in FIG. 12A. The manipulation method 215 shown in FIG. 4 is obtained based on the correlativity.

When the representative image display mode has been set and an instruction manipulation to instruct display switching (e.g., image advancing and image returning) of the image displayed on the display unit 11 is received, the control unit 140 instructs the representative image reproduction unit 150 to switch the image display based on the instruction manipulation. Further, when a group image display mode setting manipulation is performed, the control unit 140 acquires a manipulation method (the manipulation method 215 shown in FIG. 4) associated with the group corresponding to the representative image displayed on the display unit 11 upon a setting manipulation from the group image reproduction unit 160. The control unit 140 outputs the analysis reference information and the analysis instruction to the analysis unit 130 according to the acquired manipulation method. The control unit 140 is realized by, for example, a central processing unit (CPU).

The representative image reproduction unit 150 displays, on the display unit 111, image content corresponding to the representative image and non-grouped image content among the image contents stored in the image content storage unit 200 under control of the control unit 140. Specifically, when the representative image display mode has been set, the representative image reproduction unit 150 acquires the image content corresponding to the representative image and non-grouped image content from the image content storage unit 200. Subsequently, the representative image reproduction unit 150 decodes the acquired image content and renders a display image in the rendering memory 170 based on the decoded image content. The representative image reproduction unit 150 sequentially displays one of the images rendered in the rendering memory 170 on the display unit 111 under control of the control unit 140. The representative image reproduction unit 150 displays, on the display unit 111, the representative image, and manipulation support information (e.g., the manipulation support information 401 shown in FIG. 6(*a*)) supporting the setting manipulation to the group image display mode for displaying each image in the group corresponding to the representative image.

The group image reproduction unit 160 displays the grouped image contents among the image contents stored in the image content storage unit 200 on the display unit 111 in a group unit under control of the control unit 140. Specifically, when the group image display mode is set, the group image reproduction unit 160 acquires each image content belonging to the group corresponding to the representative image displayed upon the group image display mode setting manipulation from the image content storage unit 200. Subsequently, the group image reproduction unit 160 decodes the acquired image content and renders a display image in the rendering memory 170 based on the decoded image content. In this case, the group image reproduction unit 160 arranges display images and renders the images in the rendering memory 170, for example, according to a predetermined rule.

When the group image display mode setting manipulation is received, the group image reproduction unit 160 displays manipulation support information indicating a manipulation method associated with a group to be displayed, and the respective images in the group on the display unit 111 to be associated with each other. In this case, for example, the group image reproduction unit 160 changes content of the manipulation support information based on the change of the posture of the imaging device 100 detected by the posture detection unit 120. That is, the group image reproduction unit 160 sequentially displays, on the display unit 111, one image from among the images rendered in the rendering memory 170 based on the image display switching instruction output from the analysis unit 130 (an image advancing or returning instruction).

For example, the group image reproduction unit 160 determines whether the manipulation method corresponding to the manipulation support information is performed based on the change of the posture, and when the manipulation method is performed, the group image reproduction unit 160 may delete the manipulation support information.

The rendering memory 170 is a rendering buffer for holding the images rendered by the representative image reproduction unit 150 or the group image reproduction unit 160, and supplies the rendered images to the representative image reproduction unit 150 or the group image reproduction unit 160.

(Stored Content of Image Management Information Storage Unit)

FIG. 4 schematically shows stored content of the image management information storage unit 210 in the first embodiment of the present invention. Group identification information 211, image content identification information 212, group presence 213, a representative image 214, and a manipulation method 215 are stored in the image management information storage unit 210.

Identification information for identifying each group is stored in the group identification information 211. Here, the group is an image group including a plurality of image contents, associated with one another, the order of which is specified based on a predetermined rule. The group includes, for example, images 411 to 417 shown in FIGS. 7A and 8A. In the first embodiment of the present invention, an example in which an image group including a plurality of image contents, and image contents not in the image group are assigned group identification information to identify the image contents not in the image group and the image group is shown.

Identification information (image content identification information) for identifying each image content stored in the image content storage unit 200 is stored in the image content identification information 212. For example, the image content identification information of each image content is stored in image advancing or returning order (e.g., order of photographing time (record date)).

Information for identifying whether the image contents are grouped (whether the image contents belong to a group) is stored in the group presence 213. In the example shown in FIG. 4, "present" is indicated in a field of the grouped image content and "absent" is indicated in a field of the non-grouped image content.

Representative image information for specifying a representative image among a plurality of grouped image contents is stored in the representative image 214. In the example shown in FIG. 4, image content identification information (an image content identification number) of image content corresponding to the representative image is shown as the representative image information. Further, "absent" is indicated in a field of the non-grouped image content.

A manipulation method when a plurality of grouped image contents is sequentially displayed in the case in which the group image display mode has been set is stored in the manipulation method 215. The manipulation method is a manipulation method relating to the change of the posture of the imaging device 100. For example, "horizontal rotation" refers to a manipulation to sequentially display a plurality of image contents by rotating the imaging device 100 in the direction indicated by the arrow 302 about the arrow 300 (301) shown in FIGS. 1A and 1B to change the posture. Further, for example, "vertical rotation" refers to a manipulation to sequentially display a plurality of image contents by rotating the imaging device 100 in the direction indicated by the arrow 305 about the arrow 303 (304) shown in FIGS. 1A and 1B to change the posture. Further, for example, "horizontal movement" refers to a manipulation to sequentially display a plurality of image contents by moving the imaging device 100 in the direction indicated by the arrows 303 and 304 shown in FIGS. 1A and 1B to change the posture. For example, "vertical movement" refers to a manipulation to sequentially display a plurality of image contents by moving the imaging device 100 in the direction indicated by the arrows 300 and 301 shown in FIGS. 1A and 1B to change the posture. The imaging device 100 can automatically determine the manipulation method, for example, according to an imaging operation method upon generation of the image contents. Further, the manipulation method may be appropriately determined according to a user's preference by the user manipulation.

The information stored in the group identification information 211, the group presence 213, the representative image 214 and the manipulation method 215 may be recorded in an image file (image content). For example, such information can be recorded as attribute information relating to a still image file. The information recorded in the image content may be used upon image content reproduction.

(Image Display Transition Example)

FIGS. 5 and 6 schematically show image display transition examples on the input/output panel 101 in the first embodiment of the present invention. In FIG. 5(*a*), a case in which the image contents stored in the image content storage unit 200 are arranged according to a predetermined rule (order of image content identification information) is schematically shown. In the example shown in FIG. 5(*a*), only image contents #1 to #13 among the image contents stored in the image content storage unit 200 are shown. Further, the image contents #1 to #13 correspond to #1 to #13 indicated in the image content identification information 212 of FIG. 4. In FIG. 5, image contents and corresponding images are schematically shown by rectangles with image content identification information (#1 to #13). Further, grouped image contents are surrounded in a group unit by dotted rectangles.

In FIG. 5(*b*), a transition of images displayed on the input/output panel 101 when the representative image display mode has been set is shown. As shown in FIG. 5(*b*), non-grouped image contents (#1, #5, #6, and #13) and representative images (#3 and #9) of the grouped image contents are sequentially displayed based on an image advancing manipulation or an image returning manipulation by the user. The image advancing manipulation or the image returning manipulation is performed, for example, using the manipulation member included in the imaging device 100 (e.g., the touch panel or an external manipulation button (not shown)). Further, the image advancing manipulation or the image returning manipulation may be performed, for example, according to the change of the posture of the imaging device 100, similar to setting of the group image display mode.

In FIG. 6(*a*), a display transition example in which image contents #6, #9 and #13 among the images shown in FIG. 5(*b*) are sequentially displayed based on the image advancing manipulation or the image returning manipulation by the user is shown. In FIG. 6, images indicating image contents using rectangles with image content identification information (#6, #8 to #10, and #13) are schematically shown. Thus, it is possible to display each image on the input/output panel 101 based on the user manipulation. Here, when the representative image (e.g., #9) of the grouped image content is displayed on the input/output panel 101 as shown in FIG. 6(*a*), manipulation support information 401 for setting the group image display mode is displayed. The manipulation support information 401 is a manipulation button for supporting a manipulation for setting the group image display mode upon setting of the representative image display mode. That is, the user can set the group image display mode by pressing a rectangular area corresponding to the manipulation support information 401. For example, the group image display mode is set when the manipulation support information 401 is pressed in a state in which representative images (e.g., #3 and #9) of the grouped image contents are displayed on the input/output panel 101. Thus, the manipulation to press the manipulation support information 401 becomes an entrance to the group image display mode. Where the group image display mode is set, the images contents belonging to the group corresponding to the representative image displayed when the group image display mode setting manipulation (a manipulation to press the manipulation support information 401) is performed are sequentially displayed.

On the other hand, when the non-grouped image contents (e.g., #6 and #13) are displayed on the input/output panel 101 as shown in FIG. 6(*a*), the manipulation support information 401 is not displayed. Accordingly, the manipulation to press the manipulation support information 401 will not be performed and the group image display mode will not be set in a state in which the non-grouped image contents (e.g., #6 and #13) have been displayed on the input/output panel 101.

Here, a case in which a group image display mode setting manipulation (the manipulation to press the manipulation support information 401) is performed in a state in which the representative image (#9) of the grouped image content has been displayed on the input/output panel 101 is assumed. In this case, the group image reproduction unit 160 acquires image contents belonging to the group corresponding to the representative image displayed when the group image display mode setting manipulation is performed, from the image content storage unit 200. The group image reproduction unit 160 renders each image in the rendering memory 170 based on the acquired image content. In this case, the group image reproduction unit 160 renders each image in the rendering memory 170 according a predetermined rule (e.g., the order of image content identification information). An image rendering example in the rendering memory 170 is shown in FIG. 5(*c*).

In FIG. 5(*c*), a case in which the image contents belonging to the group corresponding to the representative image displayed when the group image display mode is set are rendered in the rendering memory 170 is schematically shown. When an image content rendering process is thus performed, the group image reproduction unit 160 displays the fact on the input/output panel 101 and does not perform a displaying process in the group image display mode. A display example in this case is shown in FIG. 6(*b*).

In FIG. 6(*b*), a display example when the image content rendering process is performed directly after the group image display mode setting manipulation is performed is shown. For example, manipulation support information 402 indicating the image content rendering process superimposed on the representative image (#9) displayed when the group image display mode is set is displayed on the input/output panel 101. When the image content rendering process is terminated, the group image reproduction unit 160 displays manipulation support information for supporting the image display switching manipulation in the group image display mode on the input/output panel 101. The display example is shown in FIG. 6(*c*).

In FIG. 6(*c*), a display example when the image content rendering process is terminated after the group image display mode setting manipulation is performed is shown. For example, manipulation support information 403 and 404 for supporting the image display switching manipulation in the group image display mode superimposed on the representative image (#9) displayed when the group image display mode is set is displayed on the input/output panel 101. The manipulation support information 403 and 404 is manipulation guides for supporting a manipulation for displaying each image in the group displayed on the input/output panel 101. The manipulation support information 403 and 404 shown in FIG. 6(*c*) shows that image advancing or image returning can be performed by the user performing a manipulation to rotate the imaging device 100 about the arrow 300 (301) shown in FIG. 1A in a state in which the user holds the imaging device 100 in his or her hand. In the respective drawings, the manipulation support information is shown to be relatively large for ease of explanation. Further, the image advancing manipulation and the image returning manipulation upon setting of the group image display mode will be described in detail with reference to FIGS. 7A to 13C.

Here, as shown in FIG. 6(*c*), a setting manipulation to set the representative image display mode in a state in which the group image display mode is set and the manipulation support information 403 and 404 superimposed on the image to be displayed is displayed will be described. When the representative image display mode is set in this state, for example, the user performs a touch manipulation to contact the display surface of the input/output panel 101. When the touch manipulation is performed, the mode is switched from the group image display mode to the representative image display mode (i.e., the representative image display mode is set), as shown by the arrow 405. Directly after the representative image display mode is set as such, a representative image (e.g., image #9) of the group displayed upon setting of the group image display mode is displayed. The representative image display mode may be set by a setting manipulation using the manipulation member, as well as the touch manipulation in the input/output panel 101.

(Example of Relationship Between Change of Posture of Imaging Device and Image Display Transition Upon Setting of Group Image Display Mode)

Figure 7C:
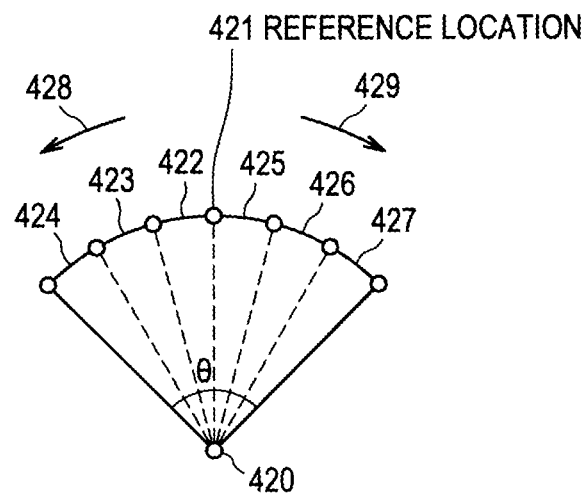
FIG. 7C shows a relationship between images displayed on the input/output panel 101 and postures of the imaging device 100 in the first embodiment of the present invention.

FIGS. 7A to 7C show a relationship between images displayed on the input/output panel 101 and postures of the imaging device 100 in the first embodiment of the present invention. In FIG. 7A, images 411 to 417 continuously displayed when the group image display mode has been set are arranged according to a predetermined rule. The images 411 to 417 belong to the same group, and the image 414 is a representative image. Further, the images 411 to 417 are sequentially displayed in the order shown in FIG. 7A according to the change of the posture of the imaging device 100.

In FIG. 7B, a manipulation range of the imaging device 100 when the images 411 to 417 are displayed is shown. In this example, an example in which the image is advanced or returned by rotating the imaging device 100 about the arrow 300 (301) shown in FIGS. 1A and 1B to change the posture is shown. The rotation angle range in this case is (theta).

In FIG. 7C, an angle as a reference (reference angle) when image advancing or image returning is performed on the images 411 to 417 is shown. In this example, an example in which image advancing or image returning is performed on seven images (images 411 to 417) when the rotation angle range (theta) is 60 degrees will be described. In this case, the reference angle (theta)1 when image advancing or image returning is performed may be 10 degrees (=60 degrees (rotation angle range (theta))/6 (number of images 411 to 417)). Specifically, the analysis unit 130 sets the location of the imaging device 100 as a reference location 421 when the group image display mode is set. When the rotation angle from the reference location 421 (rotation angle of the imaging device 100 when the arrow 300 (301) shown in FIGS. 1A and 1B is used as an axis 420) exceeds 10 degrees, the analysis unit 130 outputs an image display switching instruction to the group image reproduction unit 160. When the image display switching instruction is output, the group image reproduction unit 160 performs image advancing or image returning based on content of the instruction.

For example, the representative image (image 414) is displayed on the input/output panel 101 directly after the group image display mode is set. The user changes the posture of the imaging device 100 so that the left hand side goes down in a state in which the person 310 holds the imaging device 100 as shown in FIG. 2A. In this case, if the rotation angle from the reference location 421 exceeds 10 degrees (when the rotation angle exceeds the rotation angle range 422) when the group image display mode is set, image advancing is performed. That is, the image 415 is displayed instead of the image 414. Similarly, each time the rotation angle exceeds 10 degrees (each time the rotation angle exceeds the rotation angle ranges 423 and 424), image advancing is performed and the images 416 and 417 are sequentially displayed.

On the other hand, the person 310 changes the posture of the imaging device 100 so that the right hand side goes down in the state in which the person 310 holds the imaging device 100 as shown in FIG. 2A. In this case, if the rotation angle from the reference location 421 exceeds 10 degrees (exceeds the rotation angle range 425) when the group image display mode is set, image return is performed. That is, the image 413 is displayed instead of the image 414. Similarly, each time the rotation angle exceeds 10 degrees (each time the rotation angle exceeds the rotation angle ranges 426 and 427), the image returning is performed and the images 412 and 411 are sequentially displayed.

Figure 8A:
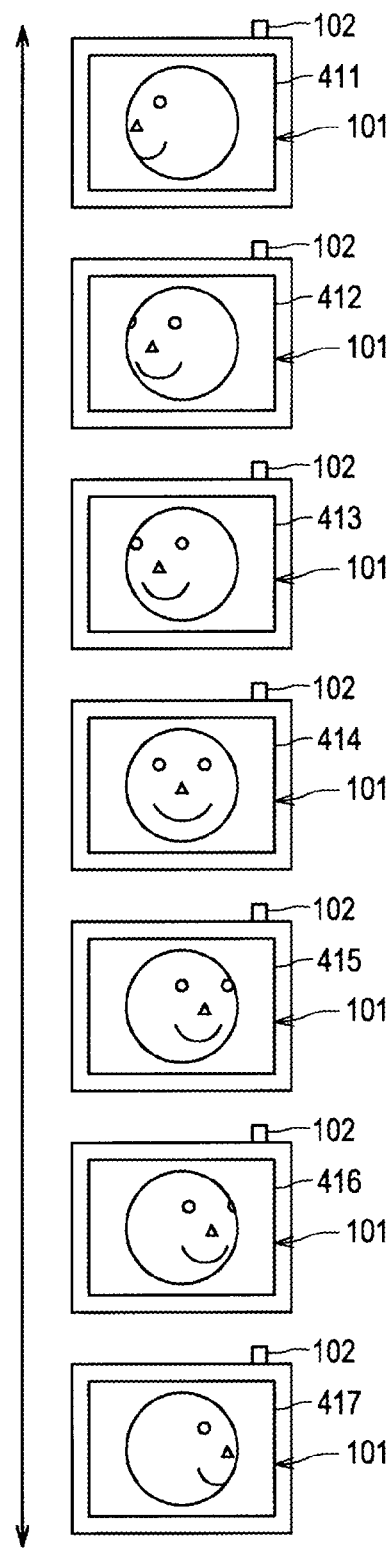
FIG. 8A schematically shows a relationship between a display transition and the posture of the imaging device 100 in the input/output panel 101 of the first embodiment of the present invention.

FIGS. 8A to 9B schematically show a relationship between a display transition and the posture of the imaging device 100 in the input/output panel 101 of the first embodiment of the present invention. In FIG. 8A, a transition of an image displayed on the input/output panel 101 is shown. The images 411 to 417 displayed on the input/output panel 101 shown in FIG. 8A are the same as the images 411 to 417 shown in FIG. 7A. In FIG. 8A, manipulation support information 411 to 417 displayed to be superimposed on the image displayed on the input/output panel 101 is omitted. A display example of the manipulation support information is shown in FIG. 9A.

Figure 8B:
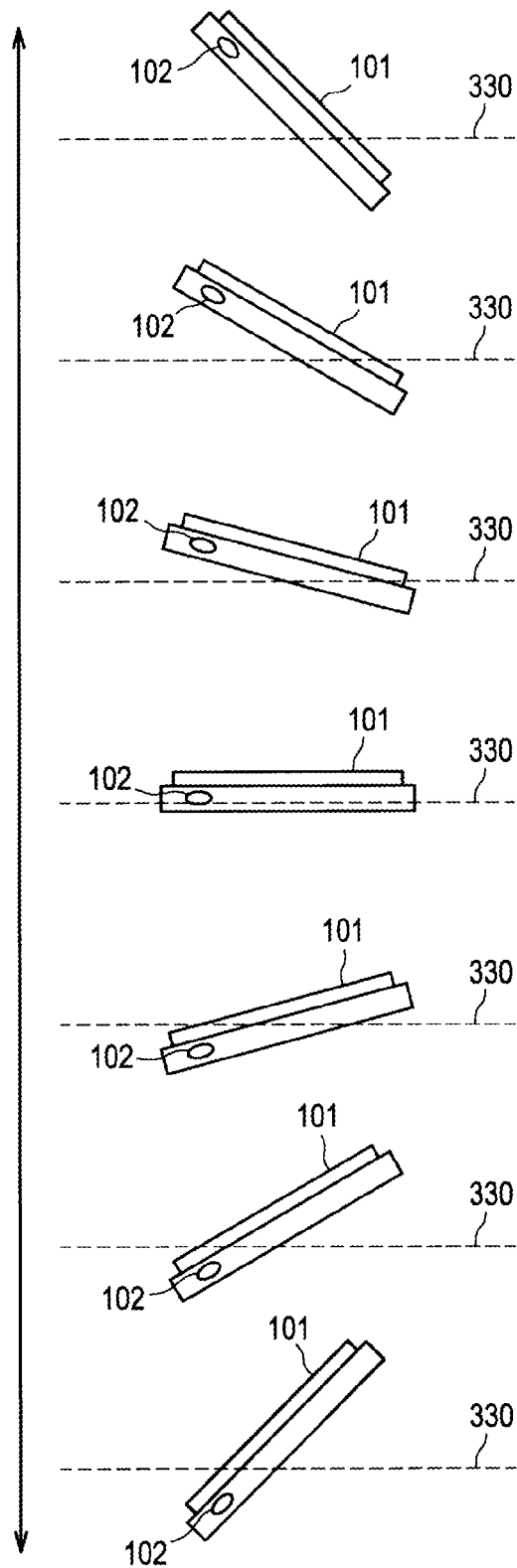
FIG. 8B schematically shows a relationship between a display transition and the posture of the imaging device 100 in the input/output panel 101 of the first embodiment of the present invention.

In FIG. 8B, one example of the posture of the imaging device 100 when an image is displayed on the input/output panel 101 shown in FIG. 8A is shown. In the example shown in FIG. 8B, a transition example in which the posture of the imaging device 100 upon setting of the group image display mode becomes parallel with a horizontal plane 330 is shown. In FIGS. 8A and 8B, the images displayed on the input/output panel 101 shown in FIG. 8A and the postures of the imaging device 100 shown in FIG. 8B are arranged at the left and right to show a correspondence relationship therebetween.

Figure 9A:
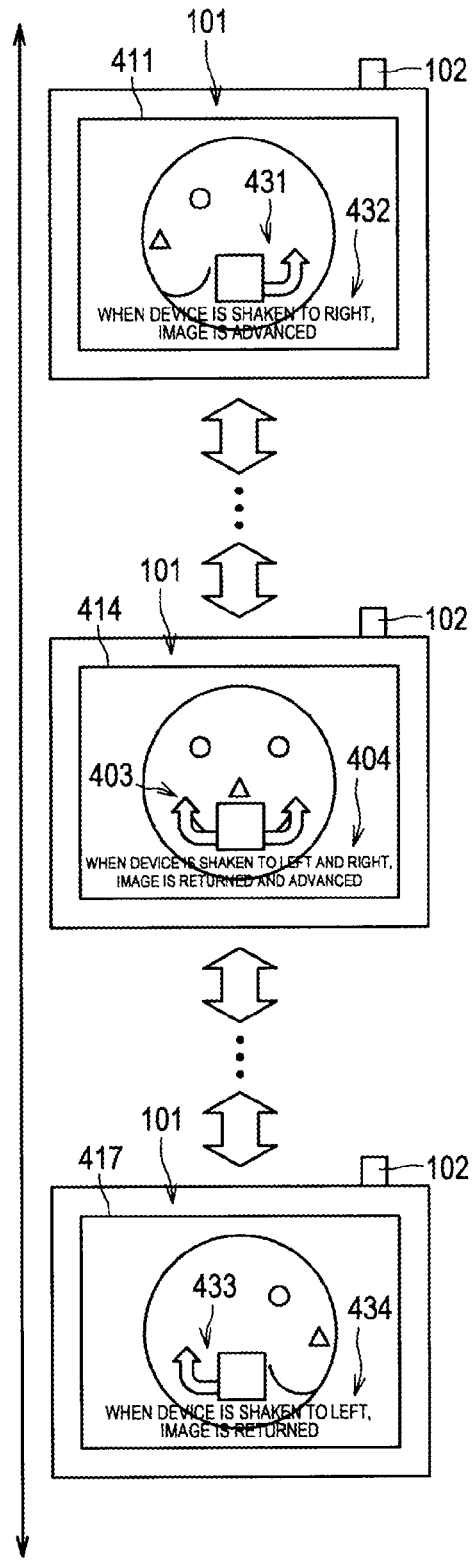
FIG. 9A schematically shows a relationship between a display transition and the posture of the imaging device 100 in the input/output panel 101 of the first embodiment of the present invention.

FIG. 9A shows a transition of an image displayed on the input/output panel 101. Images 411, 414 and 417 displayed on the input/output panel 101 shown in FIG. 9A are the same as the images 411, 414 and 417 shown in FIG. 8A. In FIG. 9A, the images 412, 413, 415 and 416 displayed on the input/output panel 101 are omitted. As described above, a representative image (image 414) is displayed on the input/output panel 101 directly after the group image display mode is set. In this case, manipulation support information 403 and 404 superimposed on the image 414 is displayed, as in FIG. 6(c). When the images 412, 413, 415 and 416 are displayed on the input/output panel 101, the manipulation support information 403 and 404 superimposed on each image is similarly displayed.

If the image 411 has been displayed on the input/output panel 101 when the group image display mode has been set, further image returning will not be performed. Accordingly, manipulation support information 431 and 432 for supporting an image advancing manipulation superimposed on the image 411 is displayed on the input/output panel 101, as shown in FIG. 9A. Further, if the image 417 has been displayed on the input/output panel 101 when the group image display mode has been set, further image advancing will not be performed. Accordingly, manipulation support information 433 and 434 for supporting image returning manipulation superimposed on the image 411 is displayed on the input/output panel 101, as shown in FIG. 9A.

The manipulation support information may be deleted or changed, for example, reduced, when image advancing and image returning are performed for a certain time (or a certain number of times) by the user manipulation.

Figure 9B:
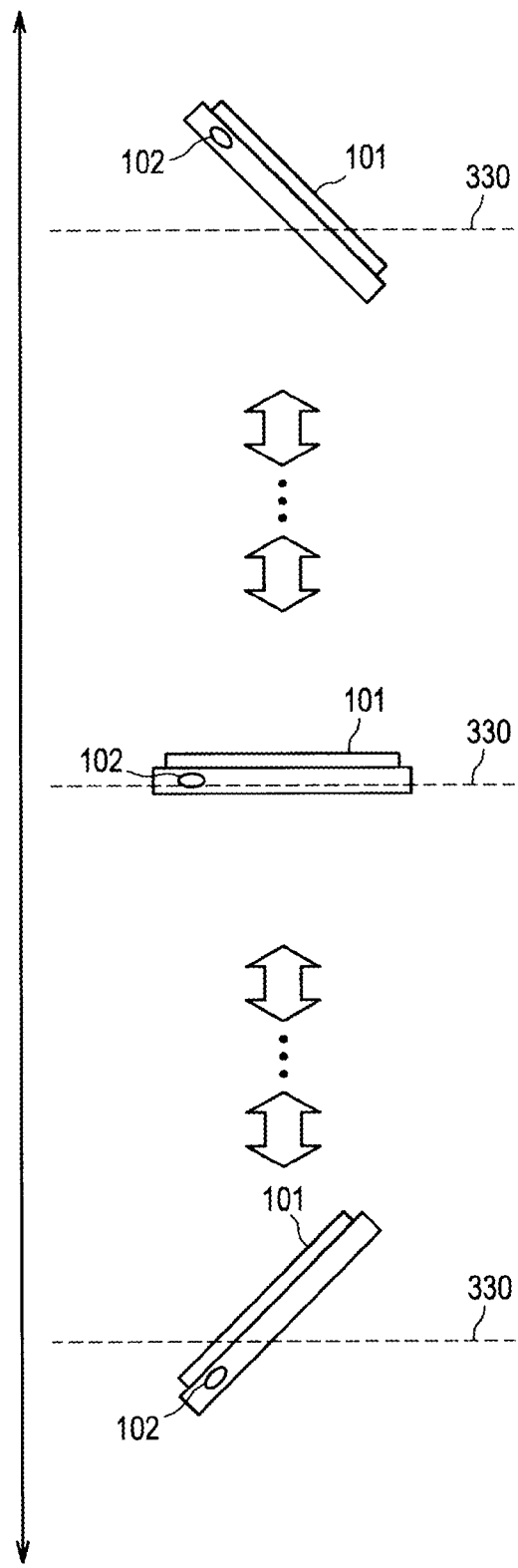
FIG. 9B schematically shows a relationship between a display transition and the posture of the imaging device 100 in the input/output panel 101 of the first embodiment of the present invention.

In FIG. 9B, one example of the posture of the imaging device 100 when the image is displayed in the input/output panel 101 shown in FIG. 9A is shown. In FIG. 9B, some of the postures of the imaging device 100 shown in FIG. 8B are omitted, similar to FIG. 9A. In FIG. 9, the images displayed on the input/output panel 101 shown in FIG. 9A and the postures of the imaging device 100 shown in FIG. 9B are arranged at the left and right to show a correspondence relationship therebetween, similar to FIG. 8.

Thus, image advancing or image return of the image displayed on the input/output panel 101 is performed by tilting the imaging device 100 to the left and right. Further, image advancing or image returning can be rapidly performed by the user rapidly performing a manipulation to tilt the imaging device 100 to the left and right.

Here, the images 411 to 417 are images obtained by imaging a face of the same person from different views. Accordingly, the user can obtain the feeling of viewing a three dimensional object (a face of a person) by rapidly performing the user manipulation to tilt the imaging device 100 to the left and right and rapidly performing image advancing or image returning. That is, the user manipulation to tilt the imaging device 100 to the left and right enables the user to obtain the feeling of viewing a pseudo-three-dimensional image.

Further, in the example in which a pseudo-three-dimensional image is displayed by performing the user manipulation to tilt the imaging device 100 to the left and right, other objects as well as the face of the person may be subjects. Hereinafter, a display example in which an image obtained by imaging the same object from different views is displayed is shown.

Figure 10A:
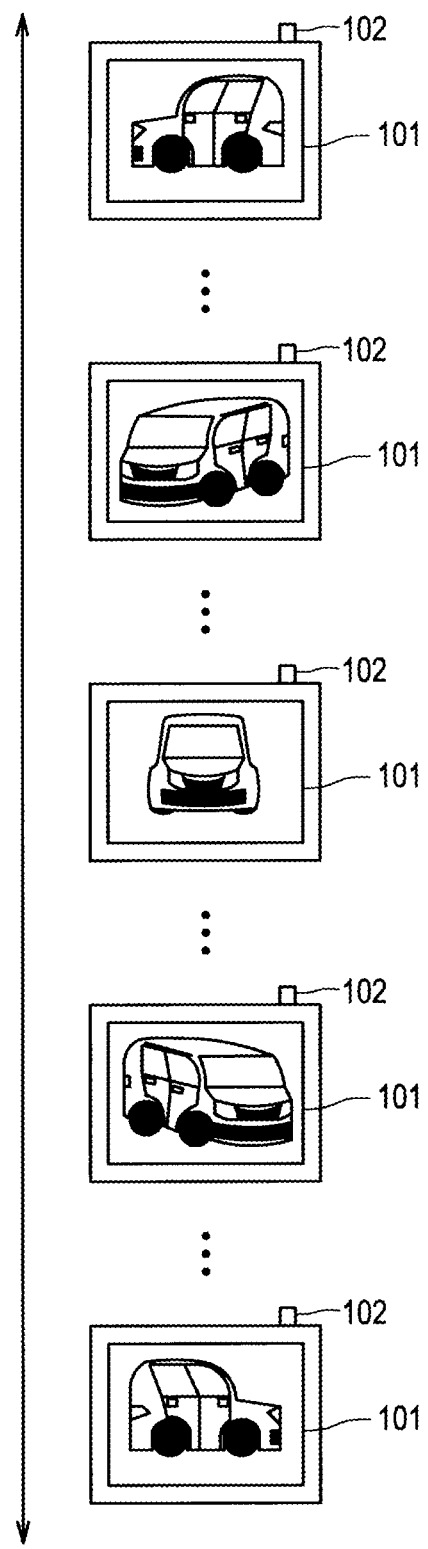
FIG. 10A shows a display transition example in the input/output panel 101 in the first embodiment of the present invention.
Figure 10B:
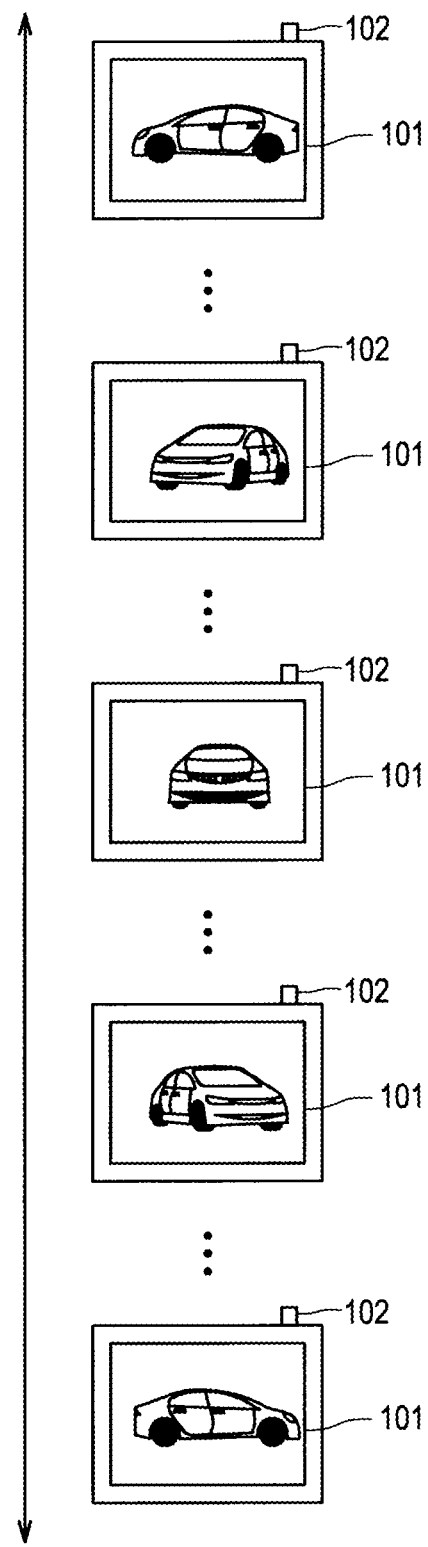
FIG. 10B shows a display transition example in the input/output panel 101 in the first embodiment of the present invention.

FIGS. 10A and 10B show a display transition example in the input/output panel 101 in the first embodiment of the present invention. In FIGS. 10A and 10B, a display transition example in the input/output panel 101 when the same vehicle is an image to be displayed is shown. In FIGS. 10A and 10B, some of the images and manipulation support information are omitted.

In FIGS. 10A and 10B, for example, a case in which the rotation angle range (theta) (shown in FIG. 7B) is 180 degrees is shown by way of example. In this case, the user can three-dimensionally view the vehicle from left and right sides thereof to a front by performing a manipulation to tilt the imaging device 100 to the left and right (a manipulation to rotate the imaging device 100 about the arrow 300 (301) shown in FIGS. 1A and 1B).

Thus, it is possible to enjoy a pseudo-three-dimensional image as a profound image by rapidly advancing an image group obtained by photographing the target subject from several angles by a gesture manipulation of the user. That is, when the user desires to three-dimensionally view the object, such as a face of a person or a vehicle, he or she can easily view a pseudo-three-dimensional image of the object through a manual manipulation.

The angle information (the rotation angle range (theta) and the reference angle (theta)1 shown in FIG. 7C) may be changed by the user manipulation to be easily viewed according to user's preference. Further, the rotation angle range (the reference angle) used for determination upon image display switching may be changed for each image based on a relationship between adjacent or neighboring images.

Further, the angle information (the rotation angle range and the reference angle) is stored in the image management information storage unit 210 to be associated with each group, and a reproduction process in the group image display mode may be performed using the stored angle information. In this case, the reference angles may be sequentially recorded, for example, based on a location relationship between the target subject (e.g., a face of a person) and the imaging device 100 in the imaging operation. For example, when the face of the person is the target subject, an imaging location from the front is 0 degrees and angles of the view from the imaging location 0 degrees using the face as a center (angles corresponding to the imaging location) are sequentially recorded as the reference angles.

Further, the angle information (the rotation angle range and the reference angle) may be obtained by performing image processing on an image to be displayed. For example, a feature amount of each image is extracted and feature amounts between adjacent or neighboring images are compared to calculate similarity between the feature amounts. The reference angle may be determined based on the similarity. For example, when the similarity is high, an angle of two views between adjacent images (an angle specified by two lines connecting the two views and the subject (one point) (an angle with the point as a center)) is assumed to be small, thus decreasing the reference angle. On the other hand, when the similarity is low, the angle of the two views between adjacent images is assumed to be great, thus increasing the reference angle. The feature amount is data for calculating the similarity between images, and may be extracted, for example, based on a color or brightness value. For example, when a face of a person is included in the image, data indicating a feature or a property of a face image for recognizing a locational relationship or shape of each portion such as eyes, nose, mouth or eyebrows constituting the face may be used as the feature amount. For example, a process of detecting a face included in each image (e.g., a face (person or animal) occupying the image above a certain percentage) may be performed, and when the face is detected, a direction of the face in each image may be detected, and the reference angle may be determined based on the direction of the face. As a method of detecting the face included in the image, for example, a face detection method using matching between a template having brightness distribution information of the face recorded therein and a content image (e.g., see Japanese Patent Laid-open Publication No. 2004-133637) may be used. Alternatively, a face detection method based on a feature amount of a portion of skin color or a person's face included in the image may be used. Furthermore, as a face direction detection method, for example, a detection method of detecting a face attribute (face direction) by means of a weak classifier using a difference value in brightness between two points in a face image may be used (e.g., see Japanese Patent Laid-open Publication No. 2009-301170). In this case, the reference angle may be determined, for example, according to a size of a face direction determination score. Further, the rotation angle range (theta) may be obtained based on each obtained reference angle (e.g., (theta)=sum of the reference angles). For example, the group image reproduction unit 160 performs calculation of such angle information under control of the control unit 140.

In the above description, the example in which a plurality of images is sequentially displayed by performing a manipulation to tilt the imaging device 100 in a predetermined direction and is three-dimensionally viewed has been shown. Here, a case in which a target subject included in a plurality of images is desired to be dynamically viewed when the images are sequentially displayed is also assumed. Further, when the plurality of images is sequentially displayed, a manipulation to move the imaging device 100 in a predetermined direction (slide manipulation) is assumed to be easier than the manipulation to tilt the imaging device 100 in a predetermined direction. Hereinafter, one example of such a manipulation method and display transition will be described.

FIGS. 11A to 13C schematically show a relationship between a display transition example in the input/output panel 101 and the posture of the imaging device 100 in the first embodiment of the present invention. In FIG. 11, an example in which a still image is displayed like a moving image by performing a manipulation to tilt the imaging device 100 in a vertical direction (the direction indicated by the arrow 305 about the arrow 303 (304) shown in FIGS. 1A and 1B) is shown. In the example shown in FIG. 11, an example in which a jogging person is a target subject is shown.

Figure 11A:
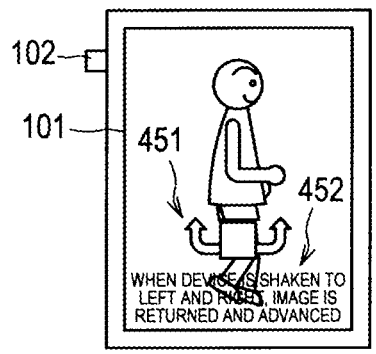
FIG. 11A schematically shows a relationship between a display transition example in the input/output panel 101 and the posture of the imaging device 100 in the first embodiment of the present invention.
Figure 11B:
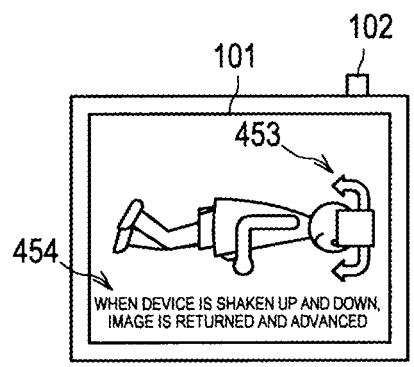
FIG. 11B schematically shows a relationship between a display transition example in the input/output panel 101 and the posture of the imaging device 100 in the first embodiment of the present invention.

In FIG. 11A, a display example of an image displayed on the input/output panel 101 is shown. As described above, the representative image is displayed on the input/output panel 101 directly after the group image display mode is set. In this case, the manipulation support information 451 and 452 superimposed on the representative image is displayed, similar to FIG. 6(*c*). For example, the manipulation support information 451 and 452 may be displayed using a state in which the user is assumed to view, as a reference. In the example shown in FIG. 11A, the user is assumed to view the input/output panel 101 so that the jogging person is in a vertical direction. Accordingly, the manipulation support information 451 and 452 is displayed so that a horizontal direction of the imaging device 100 (the direction indicated by the arrows 303 and 304 shown in FIG. 1A) becomes a user's viewing direction. As shown in FIG. 11B, the manipulation support information 453 and 454 may be displayed so that a vertical direction of imaging device 100 (the direction indicated by the arrows 300 and 301 shown in FIG. 1A) becomes the user's viewing direction. For example, such a display may be changed based on the posture change detection result from the posture detection unit 120.

In FIG. 11C, a manipulation range of the imaging device 100 when respective images shown in FIG. 11D are displayed is shown. In this example, an example in which an image is advanced or returned by rotating the imaging device 100 about the arrow 303 (304) shown in FIGS. 1A and 1B to change the posture is shown. The rotation angle range in this case is (theta)10.

In FIG. 11D, a transition of the images displayed on the input/output panel 101 is shown. The respective images displayed on the input/output panel 101 shown in FIG. 11D are images obtained by continuously photographing the jogging person using the imaging device 100. In FIG. 11D, manipulation support information displayed to be superimposed on each image displayed on the input/output panel 101 is omitted.

Thus, it is possible to provide a display form like viewing an original animation to the user by rapidly advancing an image group generated by high-speed photographing by gesture manipulation of the user.

Figure 12B:
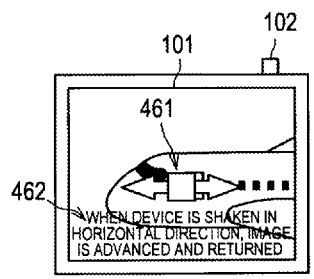
FIG. 12B schematically shows a relationship between a display transition example in the input/output panel 101 and the posture of the imaging device 100 in the first embodiment of the present invention.
Figure 12C:
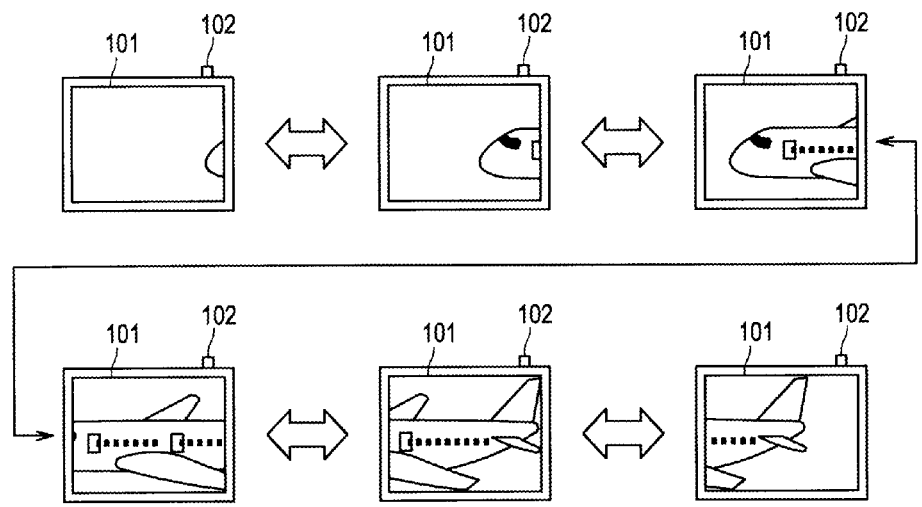
FIG. 12C schematically shows a relationship between a display transition example in the input/output panel 101 and the posture of the imaging device 100 in the first embodiment of the present invention.

In FIGS. 12A to 12C, an example in which an airplane taking off is displayed like a moving image by performing a manipulation to move the imaging device 100 in a horizontal direction (the direction indicated by the arrows 303 and 304 shown in FIGS. 1A and 1B) is shown.

In FIG. 12A, a manipulation range of the imaging device 100 in which respective images shown in FIG. 12C are displayed is shown. In this example, an example in which an image is advanced or returned by moving the imaging device 100 in the direction indicated by the arrows 303 and 304 shown in FIGS. 1A and 1B to change the posture is shown. For example, a movement distance of the imaging device 100 when image advancing or image returning is performed on one image is d1. That is, image advancing or image returning can be sequentially performed by moving the imaging device 100 by a distance d1 in the direction indicated by the arrows 303 and 304 shown in FIGS. 1A and 1B to change the posture. The movement distance d1 may be set based on a relationship between a movement distance (total distance) determined to be allowed for movement by the user manipulation and the number of images to be displayed. For example, when the total distance is d and the number of images to be displayed is 10, the movement distance d1 may be equal to d/10.

In FIG. 12B, a display example of the image displayed on the input/output panel 101 is shown. As described above, a representative image is displayed on the input/output panel 101 directly after the group image display mode is set. In this case, the manipulation support information 461 and 462 superimposed on the representative image is displayed, similar to FIG. 6(c). In this case, the manipulation support information 461 and 462 is displayed using a state in which the user is assumed to view, as a reference, similar to the example shown in FIG. 11. In the example shown in FIG. 12B, the user is assumed to view the input/output panel 101 so that the airplane taking off goes in a horizontal direction. Accordingly, the manipulation support information 461 and 462 is displayed so that a vertical direction of the imaging device 100 (the direction indicated by the arrows 300 and 301 shown in FIG. 1A) becomes a user's viewing direction.

In FIG. 12C, a transition of an image displayed on the input/output panel 101 is shown. The images displayed on the input/output panel 101 shown in FIG. 12C are images of the airplane taking off that are continuously photographed by the imaging device 100. In FIG. 12C, manipulation support information displayed to be superimposed on each image displayed on the input/output panel 101 is omitted.

In FIG. 13, an example in which a manipulation is performed to move the imaging device 100 in a horizontal direction (the direction indicated by the arrows 303 and 304 shown in FIGS. 1A and 1B) so that a high school girl is displayed as a moving image is shown.

Figure 13A:
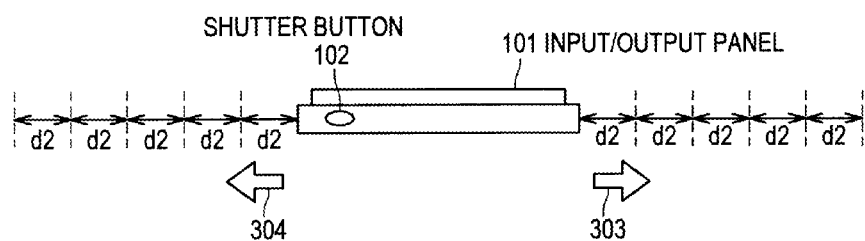
FIG. 13A schematically shows a relationship between a display transition example in the input/output panel 101 and the posture of the imaging device 100 in the first embodiment of the present invention.
Figure 13B:
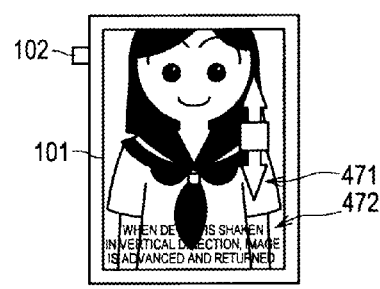
FIG. 13B schematically shows a relationship between a display transition example in the input/output panel 101 and the posture of the imaging device 100 in the first embodiment of the present invention.
Figure 13C:
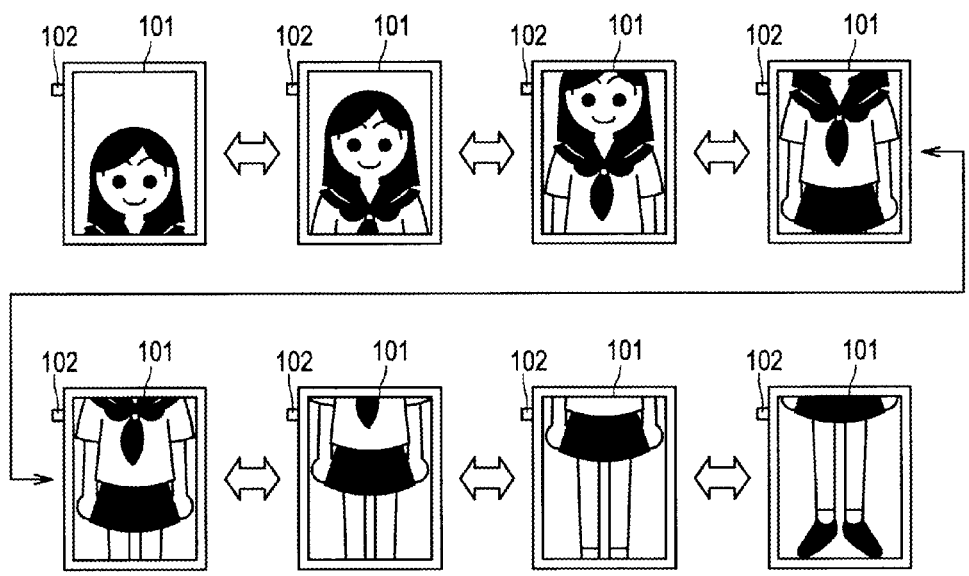
FIG. 13C schematically shows a relationship between a display transition example in the input/output panel 101 and the posture of the imaging device 100 in the first embodiment of the present invention.

In FIG. 13A, a manipulation range of the imaging device 100 when images shown in FIG. 13C are displayed is shown. In this example, an example in which image advancing or returning is performed by moving the imaging device 100 in the direction indicated by the arrows 303 and 304 shown in FIGS. 1A and 1B to change the posture is shown. For example, the movement distance of the imaging device 100 when image advancing or image returning is performed on one image is assumed to be d2. That is, image advancing or image returning may be sequentially performed by moving the imaging device 100 by a distance d2 in the direction indicated by the arrows 303 and 304 shown in FIGS. 1A and 1B to change the posture. The movement distance d2 may be calculated, similar to the example shown in FIG. 12A.

In FIG. 13B, a display example of an image displayed on the input/output panel 101 is shown. As described above, a representative image is displayed on the input/output panel 101 directly after the group image display mode is set. In this case, manipulation support information 471 and 472 superimposed on the representative image is displayed, similar to FIG. 6(c). Even in this case, manipulation support information 471 and 472 is displayed using a state in which the user is assumed to view the input/output panel 101, as a reference, similar to the example shown in FIG. 11. In the example shown in FIG. 13B, the user is assumed to view the input/output panel 101 in a state in which a high school girl is standing. Accordingly, the manipulation support information 471 and 472 is displayed so that a horizontal direction of the imaging device 100 (the direction indicated by the arrows 303 and 304 shown in FIG. 1A) becomes the user's viewing direction.

In FIG. 13C, a transition of an image displayed on the input/output panel 101 is shown. Images displayed on the input/output panel 101 shown in FIG. 13C are images obtained by continuously photographing the high school girl using the imaging device 100. In FIG. 13C, manipulation support information displayed to be superimposed on each image displayed on the input/output panel 101 is omitted.

The movement information (the total movement range and the movement distance upon image display switching) may be changed to be easily viewed by the user manipulation according to the user's preference. Further, the movement distance used for determination upon image display switching (movement distance upon image display switching) may be changed for each image based on a relationship between adjacent or neighboring images.

The movement information (the total movement angle and the movement distance upon image display switching) may be stored in the image management information storage unit 210 to be associated with each group, and a reproduction process in a group image display mode may be performed using the stored movement information. In this case, the movement distances upon image display switching can be sequentially recorded, for example, based on a locational relationship between the target subject (e.g., an airplane) and the imaging device 100 in the imaging operation. For example, when the airplane is a target subject, a predetermined location (an imaging location) separate from the side of the airplane by a predetermined distance is a reference, and a movement amount of the imaging device 100 horizontally moving from the imaging location is sequentially recorded.

Further, the movement information (the total movement range and the movement distance upon image display switching) may be obtained by performing image processing on the image to be displayed. For example, a feature amount of each image is extracted and feature amounts between adjacent images are compared to calculate a relative displacement between the adjacent images. Based on the relative displacement, a movement amount between the adjacent images and a movement direction may be calculated to determine the movement distance upon image display switching. As a method for calculating the relative displacement, for example, a calculation method of calculating a relative displacement in which pixel values are correlated in an overlapped area between images may be used. For example, a Lucas-Kanade method, a block matching method, or the like can be used to obtain the relative displacement. Further, based on the obtained movement distance upon image display switching, the total movement range d may be obtained (e.g., d=sum of the movement distances (the movement distances upon image display switching)). For example, the group image reproduction unit 160 performs calculation of such movement information under control of the control unit 140.

A manipulation method relating to the change of the posture of the imaging device 100 (a method of manipulating an image to be displayed (e.g., the manipulation method 215 shown in FIG. 4)) may be determined by performing image processing on the image to be displayed. For example, as described above, the similarity of the feature amounts between adjacent images and the relative displacement between the adjacent images are calculated by comparing the feature amounts between the adjacent images. Similarly, similarity of feature amounts between the neighboring images and the relative displacement between the neighboring images are calculated by comparing the feature amounts between the neighboring images. That is, the correlativity between the images is detected by comparing the adjacent or neighboring images. Based on such similarity and relative displacement, the manipulation method relating to the change of the posture of the imaging device 100 (the method of manipulating an image to be displayed) may be determined. For example, when a target subject included in an image to be displayed is moving in the image, the movement direction according to "horizontal movement" or "vertical movement" may be determined. Further, for example, when the similarity of the feature amount between images to be displayed is relatively high, the type of a subject included in each image (e.g., a vertical direction) according to "horizontal rotation" or "vertical rotation" may be determined. For example, the group image reproduction unit 160 may perform the determination of the manipulation method under control of the control unit 140. That is, the group image reproduction unit 160 is one example of the determination unit defined in the claims. Further, in the example shown in the foregoing, the example in which a display state in the input/output panel 101 is changed by sliding of the imaging device 100 in any of up, down, left and right directions or rotation of the imaging device 100 about such a direction has been shown. Here, the display state in the input/output panel 101 may be changed by movement of the imaging device 100 in forward and backward directions (the arrow 306 or 307 shown in FIG. 1A) or the rotation of the imaging device 100 about the direction. For example, a zoom-in/out transition in an imaged image of the target subject when a zoom-in manipulation or a zoom-out manipulation is performed using the imaging device 100 can be displayed by a manipulation method of moving the imaging device 100 back and forth.

(Operation Example of Imaging Device)

Figure 14:
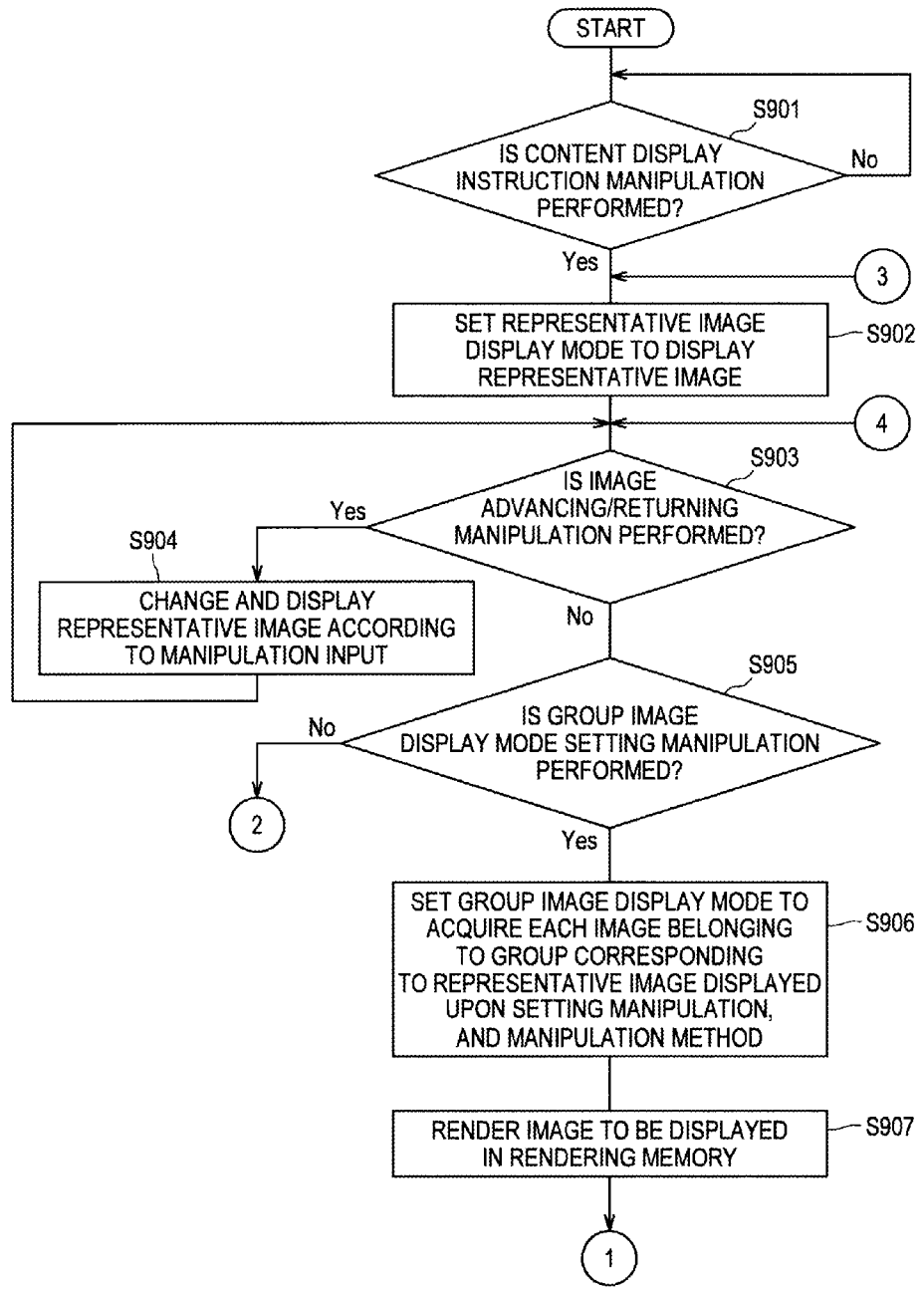
FIG. 14 is a flowchart showing an example of a processing procedure of an image content reproduction process in the imaging device 100 according to the first embodiment of the present invention.
Figure 15:
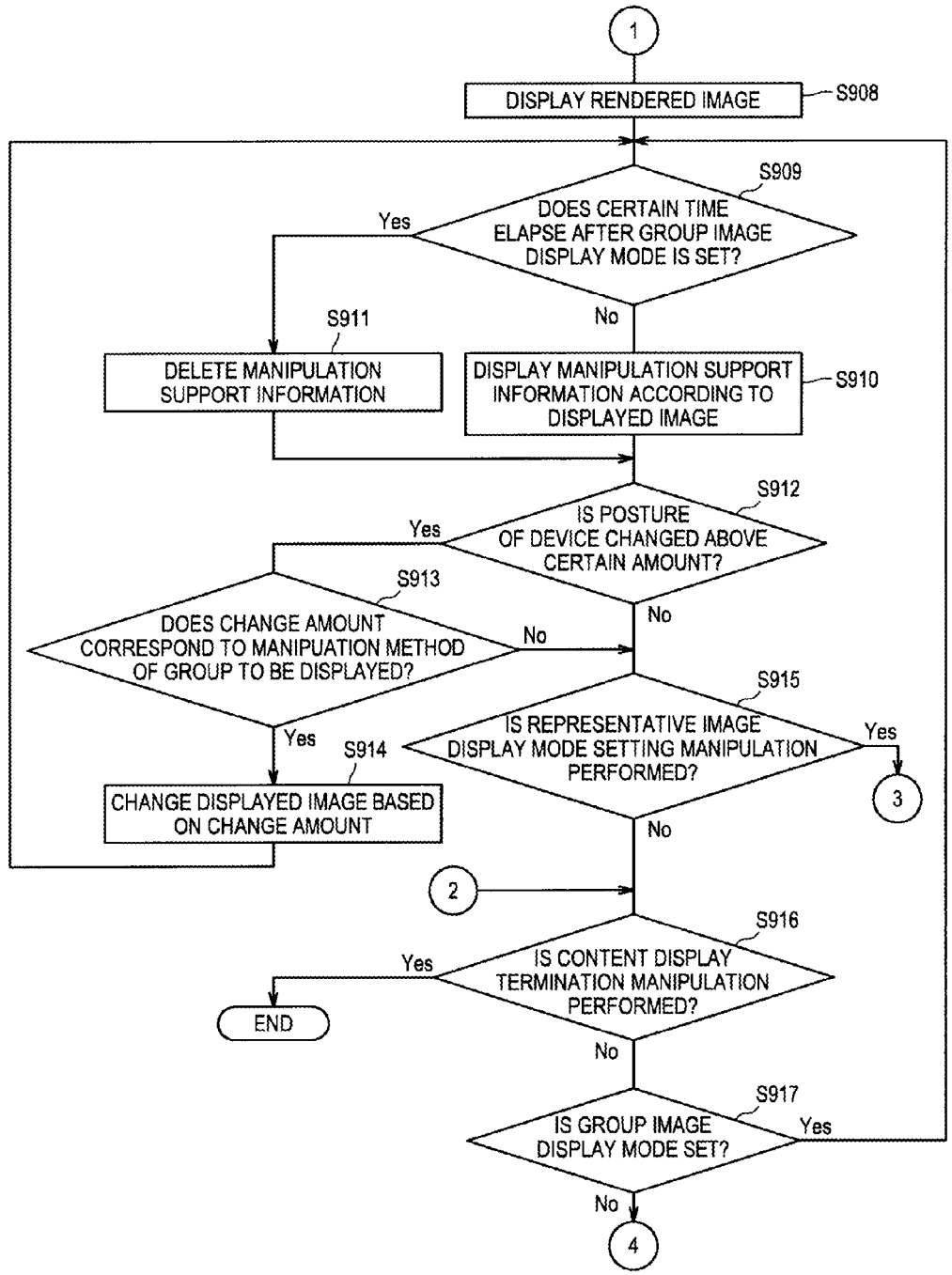
FIG. 15 is a flowchart showing an example of a processing procedure of an image content reproduction process in the imaging device 100 according to the first embodiment of the present invention.

FIGS. 14 and 15 are flowcharts showing an example of a processing procedure of an image content reproduction process in the imaging device 100 according to the first embodiment of the present invention. In this example, an example in which manipulation support information is deleted when a certain time elapses after the group image display mode is set is shown.

First, a determination is made as to whether an image content display instruction manipulation is performed (step S901), and when the display instruction manipulation is not performed, monitoring is continued. On the other hand, when the display instruction manipulation is performed (step S901), the control unit 140 sets the representative image display mode and the representative image reproduction unit 150 displays a representative image and non-grouped images on the display unit 111 (step S902).

Subsequently, a determination is made as to whether the image advancing manipulation or image returning manipulation is performed in a state in which the representative image display mode has been set (step S903). When the image advancing manipulation or the image returning manipulation is performed (step S903), the representative image reproduction unit 150 performs display switching of the image displayed on the display unit 111 (step S904). That is, image advancing or image returning of the image displayed on the display unit 111 is performed.

When the image advancing manipulation or image returning manipulation is not performed (step S903), a determination is made as to whether the group image display mode setting manipulation is performed (step S905), and when the group image display mode setting manipulation is not performed, the process proceeds to step S916. On the other hand, when the group image display mode setting manipulation is performed (step S905), the control unit 140 sets the group image display mode. The group image reproduction unit 160 acquires each image content belonging to a group corresponding to the representative image displayed on the display unit 11 upon the setting manipulation, and the manipulation method from the image content storage unit 200 (step S906).

Subsequently, the group image reproduction unit 160 decodes the acquired image content, and renders the display image in the rendering memory 170 based on the decoded image content (step S907). The group image reproduction unit 160 then displays one of the images rendered in the rendering memory 170 (the representative image) on the display unit 111 (step S908).

Subsequently, a determination is made as to whether a certain time has elapsed after the group image display mode is set (step S909). When the certain time has not elapsed after the group image display mode is set (step S909), the group image reproduction unit 160 displays manipulation support information on the display unit 111 according to the image displayed on the display unit 111 (step S910). On the other hand, when the certain time has elapsed after the group image display mode is set (step S909), the group image reproduction unit 160 deletes the manipulation support information displayed on the display unit 11 (step S911).

Subsequently, the analysis unit 130 determines whether the posture of the imaging device 100 is changed above a certain amount based on the posture change information output from the posture detection unit 120 (step S912). When the posture of the imaging device 100 is changed above a certain amount (step S912), the analysis unit 130 determines whether the change corresponds to a manipulation method (the manipulation method 215 shown in FIG. 4) associated with a group to be displayed (step S913). When the change corresponds to the manipulation method associated with the group to be displayed (step S913), the analysis unit 130 outputs a display switching instruction (an image advancing or returning instruction) for the image displayed on the display unit 11 to the group image reproduction unit 160 based on the change amount. The group image reproduction unit 160 performs display switching (image advancing or image returning) on the image displayed on the display unit 11 based on the display switching instruction (step S914) and the process returns to step S909. On the other hand, when the change does not correspond to the manipulation method associated with the group to be displayed (step S913), the process proceeds to step S915.

When the posture of the imaging device 100 is not changed above the certain amount (step S912), a determination is made as to whether the representative image display mode setting manipulation is performed (step S915), and when the setting manipulation is performed, the process returns to step S902. On the other hand, when the representative image display mode setting manipulation is not performed (step S915), a determination is made as to whether the image content display termination manipulation is performed (step S916), and when the display termination manipulation is performed, the image content reproduction process operation is terminated. When the image content display termination manipulation is not performed (step S916), a determination is made as to whether the group image display mode has been set (step S917). When the group image display mode has been set (step S917), the process returns to step S909, and when the group image display mode has not been set (that is, the representative image display mode has been set), the process returns to step S903. Steps S905 to S914 are one example of a control procedure defined in the claims. Step S912 is one example of a detection procedure defined in the claims.

2. Second Embodiment

In the first embodiment of the present invention, the example in which the images belonging to the group corresponding to the representative image displayed upon the group image display mode setting manipulation are displayed upon such a setting has been shown. Here, the number of images belonging to the group to be displayed upon setting of the group image display mode is assumed to be great. In this case, all the images belonging to the group can be sequentially displayed based on the user manipulation. However, the user manipulation range is limited and similar images are assumed to exist in the same group. In the second embodiment of the present invention, an example in which, when the number of images belonging to a group to be displayed exceeds a reference upon setting of the group image display mode, the images belonging to the group are subjected to an interleaving process and then the interleaved images are displayed is shown.

A functional configuration of the imaging device in the second embodiment of the present invention is substantially the same as the example shown in FIG. 3 except that the group image reproduction unit 160 performs the interleaving process and then displays interleaved images. Accordingly, the same units as those in the first embodiment of the present invention are denoted by the same reference numerals and a description thereof will be partially omitted.

(Interleaving Example of Image to be Displayed Upon Setting of Group Image Display Mode)

Figure 16:
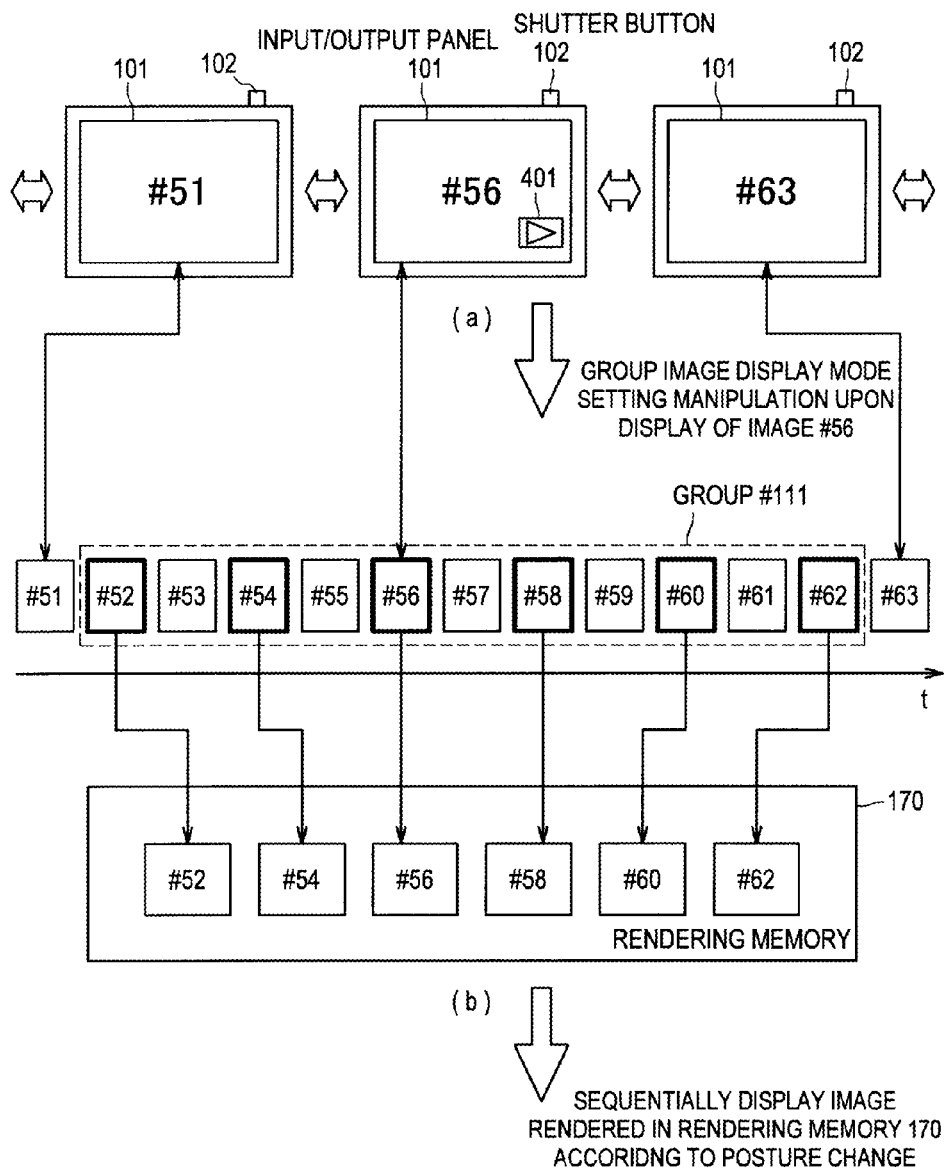
FIG. 16 schematically shows a flow of an interleaving process in the group image reproduction unit 160 according to the second embodiment of the present invention.

FIG. 16 schematically shows a flow of an interleaving process in the group image reproduction unit 160 according to the second embodiment of the present invention.

In FIG. 16(a), a display transition example when images to be displayed in the representative image display mode among the image contents stored in the image content storage unit 200 are sequentially displayed based on an image advancing manipulation or an image returning manipulation by a user is shown. Image #56 is a representative image of grouped image contents, and images #51 and #63 are images of non-grouped image contents. Further, the display example is the same as that in FIG. 6(a) except that the images to be displayed are different, and accordingly, a description thereof will be omitted herein.

In FIG. 16(b), a flow of an interleaving process performed on each image content belonging to the group corresponding to the representative image displayed upon a group image display mode setting manipulation is schematically shown. The number of image contents (#52 to #62) belonging to group #111 corresponding to the representative image (image #56) is 11.

Here, the group image display mode setting manipulation (a manipulation to press manipulation support information 401) by the user is assumed to be performed in a state in which the representative image of the grouped image content (#56) is displayed on the input/output panel 101. In this case, the group image reproduction unit 160 acquires each image content belonging to the group corresponding to the representative image displayed upon a group image display mode setting manipulation from the image content storage unit 200. Subsequently, the group image reproduction unit 160 determines whether the number of the acquired image contents exceeds a certain value. Subsequently, when the number of the acquired image contents does not exceed the certain value, the group image reproduction unit 160 renders each image in the rendering memory 170 based on the acquired image content. On the other hand, when the number of the acquired image contents does not exceed the certain value, the group image reproduction unit 160 performs an interleaving process on the acquired image content and renders each image in the rendering memory 170 based on the interleaved image content. That is, when the number of the acquired image contents exceeds the certain value, the group image reproduction unit 160 extracts a predetermined number of image contents upon a group image display mode manipulation under control of the control unit 140. The extracted image contents are images to be displayed. In the interleaving process, for example, interleaving is performed so that the number of the acquired image contents is in a range of certain values.

Here, the certain value used when the determination is made as to whether the interleaving process is to be performed will be described. The certain value may be determined, for example, based on a relationship between a range in which the posture of the imaging device 100 can be allowed to be changed by the user and a display switching range of one image in the range. For example, a case in which the imaging device 100 is rotated to the left and right about the arrows 300 and 301 shown in FIG. 1A will be described. For example, the range in which the posture of the imaging device 100 can be allowed to be changed by the user (a rotation angle when the imaging device 100 is rotated to the left and right) is 90 degrees and the display switching angle of one image in the range is 5 degrees. In this case, the certain value used when the interleaving process is performed may be 18 (=90/5).

Further, the certain value may be determined, for example, based on a relationship between a time when the group image reproduction unit 160 reads the image content from the image content storage unit 200 and a waiting time that can be allowed by the user. For example, the time when the group image reproduction unit 160 reads the image content from the image content storage unit 200 (a time per one image content) is 100 msec and the waiting time that can be allowed by the user is 3 sec. In this case, the certain value used when the interleaving process is performed may be 30 (=3/0.1).

Further, the certain value may be determined, for example, based on a viewing angle of the imaging element and the number of images that can be developed in the rendering memory 170. The imaging element is, for example, a charge coupled device (CCD) or a complementary metal oxide semiconductor (CMOS).

Here, in the example shown in FIG. 16(*b*), a case in which the certain value used when the interleaving process is performed is 6 will be described. For example, the number of image contents (#52 to #62) belonging to group #111 corresponding to the representative image (image #56) displayed upon a group image display mode setting manipulation is 11. Accordingly, the group image reproduction unit 160 determines that the number (11) of image contents acquired from the image content storage unit 200 exceeds a certain value (6) and performs an interleaving process on the acquired image contents. For example, as shown in FIG. 16(*b*), the group image reproduction unit 160 interleaves five image contents from the image contents (#52 to #62) belonging to group #111 at certain intervals (every other). In the interleaving process, for example, it is preferable that interleaving is performed so that the representative image is included in the interleaved images. For example, the interleaving process may be performed based on the attribute of the image content or a degree of correlativity between the images. For example, when a face of a person is included in the image content, the interleaving process may be performed so that an image having a high evaluation value for facial expression can be preferentially left.

Based on the thus interleaved image contents (#52, #54, #56, #58, #60, and #62 (shown by a bold border in FIG. 16(*b*))), the group image reproduction unit 160 renders each image in the rendering memory 170.

(Operation Example of Imaging Device)

Figure 17:
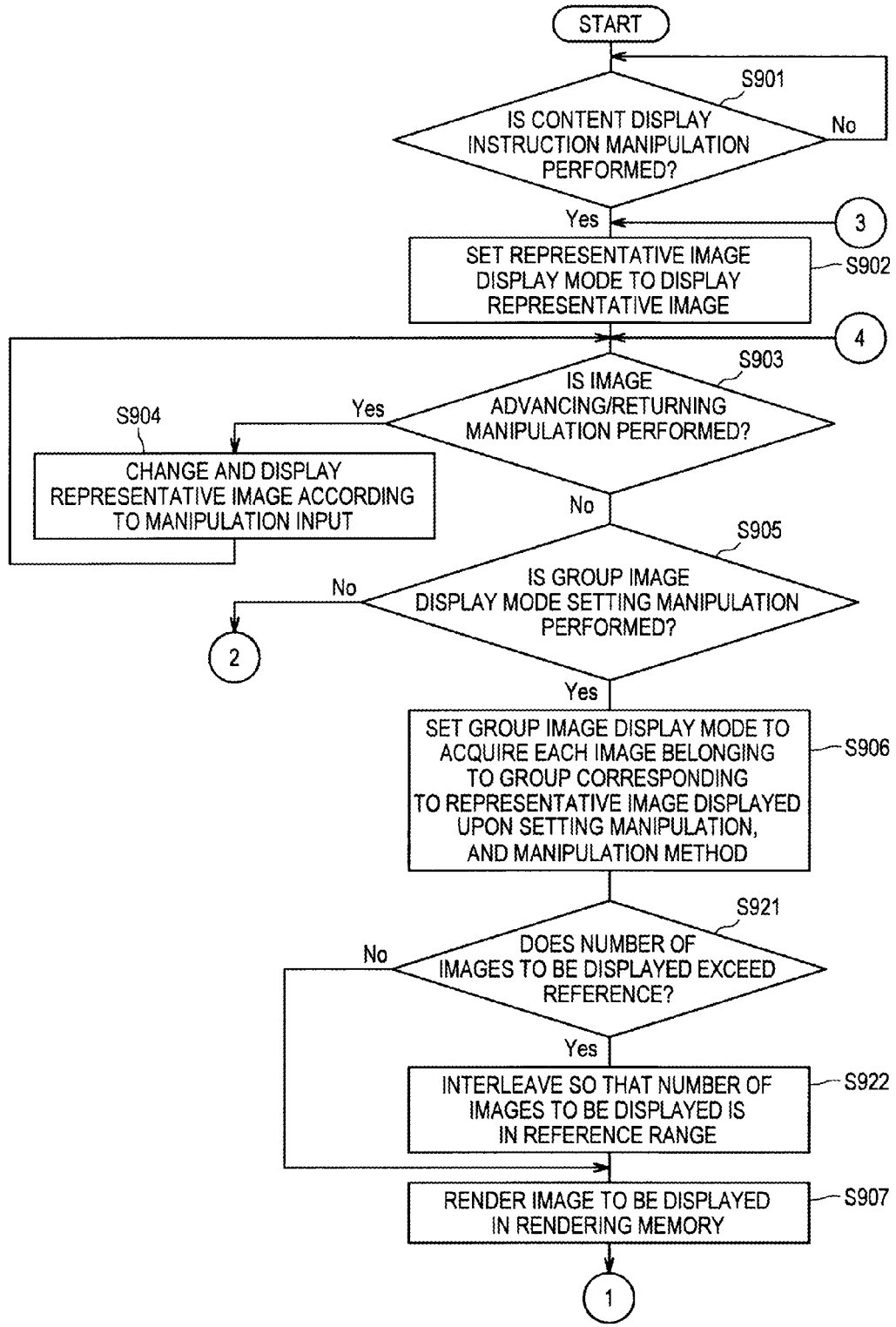
FIG. 17 is a flowchart showing an example of a processing procedure of an image content reproduction process in the imaging device 100 according to the second embodiment of the present invention.

FIG. 17 is a flowchart showing an example of a processing procedure of an image content reproduction process in the imaging device 100 according to the second embodiment of the present invention. This processing procedure is a variant of FIGS. 14 and 15, and differs from that shown in FIGS. 14 and 15 in that the interleaving process is performed. Further, because the processing procedure is the same as that shown in FIGS. 14 and 15 in other configurations, the same units as those in FIGS. 14 and 15 are denoted by the same reference numerals and a description thereof will be omitted.

Each image belonging to a group to be displayed in the group image display mode and the manipulation method are acquired (step S906) and then the group image reproduction unit 160 determines whether the number of the acquired images exceeds a reference (step S921). When the number of the acquired images exceeds the reference (step S921), the group image reproduction unit 160 performs the interleaving process so that the number of the acquired images is in a reference range (step S922). On the other hand, when the number of the acquired images does not exceed the reference (step S921), the process proceeds to step S907.

Thus, when there are a number of images to be displayed in the group image display mode, images displayed upon setting of the group image display mode can be easily viewed by performing the interleaving process so that the number of the images to be displayed is appropriate. That is, image advancing and returning can be performed in a range in which the user is allowed to manipulate the posture of the imaging device 100. Accordingly, the image advancing manipulation or the image returning manipulation can be prevented from being performed in an unintentional range.

When there are a number of images to be displayed in the group image display mode, the interleaving process is performed so that the number of the images to be displayed is appropriate, making it unnecessary for the group image reproduction unit 160 to read all the images to be displayed. Accordingly, it is possible to reduce a reading time of the images to be displayed and a waiting time until image reproduction in the group image display mode is initiated.

As described above, according to the embodiments of the present invention, a manipulation to switch the representative image display mode and the group image display mode can be easily performed by the user manipulation, thus making it possible to easily display each image preferred by the user. For example, the group image display mode setting manipulation can be performed by merely pressing the manipulation support information (e.g., the manipulation support information 401 shown in FIG. 6(*a*)). Further, when the group image display mode is set, the representative image display mode setting manipulation can be performed by merely touching the display surface.

When the group image display mode is set, the image group can be rapidly advanced or returned according to the gesture manipulation by the user, thus allowing the user to enjoy the gesture manipulation.

Further, when the group image display mode is set, manipulation support information (manipulation guide) according to the gesture manipulation is displayed to be associated with the display image, thus leading to smooth gesture manipulation by the user. Further, when the group image display mode is set, each image to be displayed is rendered in the rendering memory 170, making it unnecessary to read the images to be displayed each time the image is advanced or returned, and smooth image advancing or image returning can be performed according to user gesture manipulation. Further, when the group image display mode is set, image advancing or image returning according to a range that can be manipulated by the user can be performed, thereby preventing image advancing or image returning in an unintentional area. Thus, it is possible to perform image advancing and image returning manipulations in a manipulation range that the user finds comfortable.

When the representative image display mode is set, it is possible to realize high-speed image advancing or image returning of normal reproduction by reading and displaying only the representative image, thereby decreasing user displeasure (e.g., displeasure caused by the waiting time). When the representative image display mode is set, the gesture manipulation is not performed, thus preventing malfunction caused by an unintentional user gesture manipulation.

Thus, according to the embodiments of the present invention, when a plurality of images associated with one another is displayed, each image can be displayed to be easily viewed.

While the imaging device has been described by way of example in the embodiments of the present invention, the embodiments of the present invention may be applied to an image processing device capable of displaying image contents stored in the recording medium on the display unit. For example, the embodiments of the present invention may be applied to image processing devices, such as a mobile phone, a navigation system, and a portable media player with an imaging function.

The embodiment of the present invention illustrates one example for embodying the present invention, and the matters in the embodiment of the present invention and the specified matters of the invention in the claims have a correspondence relationship, as described in the embodiment of the present invention. Similarly, the specified matters of the invention in the claims and the matters in the embodiment of the present invention having the same names as the specified matters have a correspondence relationship. Here, the present invention is not limited to the embodiments, and various variations may be made to the embodiments without departing from the spirit and scope of the present invention.

Further, the processing procedure described in the embodiments of the present invention may be regarded as a method including a series of procedures or as a program for causing a computer to execute a series of procedures or a recording medium having the program stored thereon. The recording medium may be, for example, a compact disc (CD), a mini disc (ND), a digital versatile disc (DVD), a memory card, a Blu-ray disc (registered trademark) or a non-transitory storage medium or the like.

It should be understood by those skilled in the art that various modifications, combinations, sub-combinations and alterations may occur depending on design requirements and other factors insofar as they are within the scope of the appended claims or the equivalents thereof.

The invention claimed is:

1. A method for controlling an image processing device which displays an image, the method comprising:
    guiding a user how to manipulate to display each image in a group of images on a display screen in a group of image display mode;
    switching between the group of image display mode and a representative image display mode;
    controlling display of the each image in the group of the images on the display screen in the group of image display mode according to a change of posture of the image processing device; and
    controlling display of each representative image on the display screen not in accordance with the change of the posture in the representative image display mode.

2. The method according to claim 1, wherein the guiding how to manipulate to display the each image in the group of images on the display screen in the group of image display mode is performed by controlling display of a manipulation guide on the display screen.

3. The method according to claim 2, wherein the manipulation guide is displayed for a predetermined period.

4. The method according to claim 3, further comprising:
    deleting the manipulation guide from the display screen after the predetermined period is elapsed.

5. The method according to claim 2, wherein the manipulation guide is superimposed on a second representative image in the group of image display mode.

6. The method according to claim 1, further comprising:
    controlling display on the display screen so image advancing and image returning relative to a second representative image are performed in the group of image display mode.

7. The method according to claim 6, wherein the manipulation guide indicates that the image advancing or the image returning can be performed by the user performing a manipulation to rotate the image processing device.

8. The method according to the claim 6, wherein the manipulation guide indicates that the image advancing or the image returning can be performed by the user performing a manipulation to move the image processing device by a predetermined distance.

9. The method according to claim 1, further comprising:
    preparing at least one image of the group of images in a case of switching from the representative image display mode to the group of image display mode.

10. The method according to claim 9, further comprising:
    notifying the user that the at least one image of the group of the images is under preparation.

11. The method according to claim 1, further comprising:
    switching from the representative image display mode to the group of image display mode in a case that a second representative image on the display screen is touched by the user in the representative image display mode.

12. The method according to claim 1, wherein the group of images is a multi-view image.

13. The method according to claim 1, wherein the controlling display of the each representative image on the display screen in the representative image display mode is performed in response to the user touching a display.

14. The method according to claim 1, wherein a second representative image within the group of images is initially displayed in a case of switching from the representative image display mode to the group of image display mode.

15. An image processing device comprising:
    a display; and
    circuitry configured to:
        switch between a first display mode in which one of a plurality of representative images is displayed on the display and a second display mode in which a selected view from different views all of which correspond to a single representative image selected from the plurality of representative images is displayed on the display;
        control to change the view on the display according to a change of posture of the image processing device in the second display mode; and
        control to change each representative image displayed on the display not in accordance with the change of the posture in the first display mode.

16. The image processing device according to claim 15, wherein the circuitry is configured to guide how to manipulate to display each image of the plurality of representative images on the display screen in the first display mode by controlling display of a manipulation guide on the display screen.

17. The image processing device according to claim 16, wherein the manipulation guide is displayed for a predetermined period.

18. The image processing device according to claim 17, wherein the circuitry is configured to delete the manipulation guide from the display screen after the predetermined period is elapsed.

19. The image processing device according to claim 16, wherein the manipulation guide is superimposed on a second representative image of the plurality of representative images in the second display mode.

20. The image processing device according to claim 16, wherein the manipulation guide indicates that the image advancing or the image returning can be performed by a user performing a manipulation to rotate the image processing device.

21. The image processing device according to claim 16, wherein the manipulation guide indicates that the image advancing or the image returning can be performed by a user performing a manipulation to move the image processing device by a predetermined distance.

22. The image processing device according to claim 15, wherein the different views show a same subject.

23. The image processing device according to claim 15, wherein the circuitry is configured to:
control display on the display screen so image advancing and image returning relative to a second representative image of the plurality of representative images are performed in the second display mode.

24. The image processing device according to claim 15, wherein the circuitry is configured to prepare at least one image of the plurality of representative images in a case of switching from the first display mode to the second display mode.

25. The image processing device according to claim 24, wherein the circuitry is configured to notify a user that the at least one image of the plurality of representative images is under preparation.

26. The image processing device according to claim 15, wherein the circuitry is configured to switch from the first display mode to the second display mode in a case that the single representative image on the display screen is touched by a user in the first display mode.

27. The image processing device according to claim 15, wherein the circuitry is configured to control display of the each representative image on the display screen in the first display mode in response to a user touching a display.

28. The image processing device according to claim 15, wherein the single representative image of the plurality of representative images is initially displayed in a case of switching from the first display mode to the second display mode.

29. A method for controlling an image processing device having a display screen, the method comprising:
switching between a first display mode in which one of a plurality of representative images is displayed on the display screen and a second display mode in which a selected view from different views all of which correspond to a single representative image selected from the plurality of representative images is displayed on the display screen;
controlling to change the view on the display screen according to a change of posture of the image processing device in the second display mode; and
controlling to change each representative image displayed on the display screen not in accordance with the change of the posture in the first display mode.

30. The method according to claim 29, wherein the different views show a same subject.

31. The method according to claim 29, further comprising:
guiding how to manipulate to display each image of the plurality of the representative images on the display screen in the second display mode by controlling display of a manipulation guide on the display screen.

32. The method according to claim 31, wherein the manipulation guide is superimposed on a second representative image of the plurality of representative images in the second display mode.

33. The method according to claim 31, wherein the manipulation guide indicates that the image advancing or the image returning can be performed by a user performing a manipulation to rotate the image processing device.

34. The method according to claim 31, wherein the manipulation guide indicates that the image advancing or the image returning can be performed by a user performing a manipulation to move the image processing device by a predetermined distance.

35. The method according to claim 29, further comprising:
controlling display on the display screen so image advancing and image returning relative to a second representative image of the plurality of representative images are performed in the second display mode.

36. The method according to claim 31, wherein the manipulation guide is displayed for a predetermined period.

37. The method according to claim 36, further comprising:
deleting the manipulation guide from the display screen after the predetermined period is elapsed.

38. The method according to claim 29, further comprising:
preparing at least one image of the plurality of representative images in a case of switching from the first display mode to the second display mode.

39. The method according to claim 38, further comprising:
notifying a user that the at least one image of the plurality of representative images is under preparation.

40. The method according to claim 29, further comprising:
switching from the first display mode to the second display mode in a case that the single representative image on the display screen is touched by a user in the first display mode.

41. The method according to claim 29, further comprising:
controlling display of the each representative image on the display screen in the first display mode in response to a user touching a display.

42. The method according to claim 29, wherein the single representative image of the plurality of representative images is initially displayed in a case of switching from the first display mode to the second display mode.

* * * * *